(12) United States Patent
Roach et al.

(10) Patent No.: US 10,390,165 B2
(45) Date of Patent: Aug. 20, 2019

(54) MIXED REALITY SYSTEM WITH SPATIALIZED AUDIO

(71) Applicant: Magic Leap, Inc., Plantation, FL (US)

(72) Inventors: David Thomas Roach, Plantation, FL (US); Samuel A Miller, Hollywood, FL (US); George Alistair Sanger, Coronado, CA (US); Brian Schmidt, Bellevue, WA (US); Terry Michael O'Gara, Fort Lauderdale, FL (US); Anastasia Andreyevna Tajik, Fort Lauderdale, FL (US); Jehangir Tajik, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/666,210

(22) Filed: Aug. 1, 2017

(65) Prior Publication Data

US 2018/0035234 A1 Feb. 1, 2018

Related U.S. Application Data

(60) Provisional application No. 62/369,561, filed on Aug. 1, 2016.

(51) Int. Cl.
*H04S 7/00* (2006.01)
*G02B 27/01* (2006.01)

(52) U.S. Cl.
CPC ............ *H04S 7/303* (2013.01); *G02B 27/017* (2013.01); *H04S 2400/11* (2013.01); *H04S 2400/15* (2013.01); *H04S 2420/01* (2013.01)

(58) Field of Classification Search
CPC .. H04S 7/303; H04S 2400/11; H04S 2400/15; H04S 2420/01; G02B 27/017

(Continued)

(56) References Cited

U.S. PATENT DOCUMENTS 7,706,543 B2 4/2010 Daniel
8,472,653 B2 6/2013 Kon
(Continued)

OTHER PUBLICATIONS

PCT International Search Report and Written Opinion for International Appln. No. PCT/US2017/044921, Applicant Magic Leap, Inc., Forms PCT/ISA/210, 220, and 237, dated Oct. 12, 2017 (12 pages).

(Continued)

*Primary Examiner* — Vivian C Chin
*Assistant Examiner* — Douglas J Suthers
(74) *Attorney, Agent, or Firm* — Vista IP Law Group LLP

(57) ABSTRACT

A dual source spatialized audio system includes a general audio system and a personal audio system. The general system includes a general audio processor and general speakers to produce general sound. The personal system includes a frame to be worn on a head of a user and a plurality of personal speakers attached to the frame. The personal system also includes a head pose sensor to collect head pose data of the user. The personal system further includes a head pose processor to determine a head pose of the user from the head pose data. Moreover, the personal system includes a personal audio processor to generate personal audio data based on the head pose of the user. The personal speakers generate personal sound corresponding to the personal audio data. The personal processor receives timing information/metadata from the general audio processor to synchronize the personal sound with the general sound.

18 Claims, 25 Drawing Sheets

(58) Field of Classification Search
USPC .......................................................... 381/17
See application file for complete search history.

(56) References Cited

U.S. PATENT DOCUMENTS

| | | |
|---|---|---|
| 9,285,872 B1 | 3/2016 | Raffle et al. |
| 2007/0277092 A1 | 11/2007 | Basson et al. |
| 2008/0008342 A1* | 1/2008 | Sauk ................ H04S 1/002 |
| | | 381/315 |
| 2012/0082319 A1 | 4/2012 | Jot et al. |
| 2012/0237037 A1* | 9/2012 | Ninan ................ H04S 7/304 |
| | | 381/17 |
| 2015/0205126 A1 | 7/2015 | Schowengerdt |
| 2016/0026253 A1 | 1/2016 | Bradski et al. |

OTHER PUBLICATIONS

Extended European Search Report for European Patent Application No. 17837548.1, Applicant Magic Leap, Inc., dated Jun. 25, 2019, 10 pages.

* cited by examiner

MIXED REALITY SYSTEM WITH SPATIALIZED AUDIO

CROSS-REFERENCE TO RELATED APPLICATIONS

The present application claims priority to U.S. Provisional Application Ser. No. 62/369,561, filed on Aug. 1, 2016 under and entitled "MIXED REALITY SYSTEM WITH SPATIALIZED AUDIO." The present application is related to U.S. Provisional Patent Application Ser. No. 62/291,363, filed on Feb. 4, 2014, U.S. Provisional Patent Application Ser. No. 62/012,273, filed on Jun. 14, 2014, U.S. Utility patent application Ser. No. 14/738,877 filed on Jun. 13, 2013, and U.S. Utility patent application Ser. No. 14/555,585 filed on Nov. 27, 2014. The contents of these patent applications are hereby expressly and fully incorporated by reference in their entirety, as though set forth in full. Described in the aforementioned incorporated patent applications are various embodiments of virtual reality, augmented reality, or mixed reality systems including spatialized audio systems. Described herein are further embodiments of virtual, augmented, or mixed reality systems with spatialized audio systems and methods.

FIELD OF THE INVENTION

The present disclosure relates to virtual, augmented, or mixed reality with spatialized audio systems, individualized cinema video and audio systems and methods for generating a virtual reality, augmented reality, or mixed reality experience including spatialized audio using same.

BACKGROUND

Current spatialized audio systems, such as those for home theaters and video games, utilize the "5.1" and "7.1" formats. A 5.1 spatialized audio system includes left and right front channels, left and right rear channels, a center channel and a subwoofer. A 7.1 spatialized audio system includes the channels of the 5.1 audio system and left and right channels aligned with the intended listener. Each of the above-mentioned channels corresponds to a separate speaker. Cinema audio systems and cinema grade home theater systems include DOLBY ATMOS, which adds channels configured to be delivered from above the intended listener, thereby immersing the listener in the sound field and surrounding the listener with sound.

Despite improvements in spatialized audio systems, current spatialized audio systems are not capable of taking into account the location and orientation of a listener, not to mention the respective locations and orientations of a plurality of listeners. Therefore, current spatialized audio systems generate sound fields with the assumption that all listeners are positioned adjacent the center of the sound field and oriented facing the center channel of the system, and have listener position and orientation requirements for optimal performance. Accordingly, in a classic one-to-many system, spatialized audio may be delivered to a listener such that the sound appears to be backwards, if that listener happens to be facing opposite of the expected orientation. Such misaligned sound can lead to sensory and cognitive dissonance, and degrade the spatialized audio experience, and any "virtual reality" or "augmented reality" experience presented therewith. In serious cases, sensory and cognitive dissonance can cause physiological side-effects, such as headaches, nausea, discomfort, etc., that may lead users to avoid spatialized audio experiences, "virtual reality" experiences or "augmented reality" experiences.

Modern computing and display technologies have facilitated the development of systems for so called "virtual reality" ("VR"), "augmented reality" ("AR"), and "mixed reality" ("MR") experiences, wherein digitally reproduced are integrated into the real world environment of the user and presented as though they are real objects existing in the inertial reference frame of the real world environment. A virtual reality, or "VR", scenario can involve presentation of digital or virtual image information while occluding the user's view of the real world. An augmented reality, or "AR", scenario typically involves presentation of digital or virtual image information as an augmentation to the visible actual world around the user (i.e., transparency to other actual real-world visual input). A mixed reality, or "MR", system also introduces simulated objects into a real-world environment, but these objects typically feature a greater degree of interactivity than in AR systems. The simulated elements can often times be interactive in real time. Accordingly, AR and MR scenarios involve presentation of digital or virtual image information superimposed on the real world environment of the user which is simultaneously visible to the user.

Various optical systems generate images at multiple depths for displaying VR/AR/MR scenarios. Some such optical systems are described in U.S. Utility patent application Ser. No. 14/738,877 and U.S. Utility patent application Ser. No. 14/555,585 filed on Nov. 27, 2014, the contents of which have been previously incorporated-by-reference herein.

Current spatialized audio systems can cooperate with 3-D optical systems, such as those in 3-D cinema, 3-D video games and VR/AR/MR systems, to render, both optically and sonically, virtual objects. Objects are "virtual" in that they are not real physical objects located in respective positions in three-dimensional space. Instead, virtual objects only exist in the brains (e.g., the optical and/or auditory centers) of viewers and/or listeners when stimulated by light beams and/or soundwaves respectively directed to the eyes and/or ears of audience members. Unfortunately, the listener position and orientation requirements of current spatialized audio systems limit their ability to create the audio portions of virtual objects in a realistic manner for out-of-position listeners.

Current head-worn audio systems (i.e., headphones or earbuds) can be configured to produce spatialized audio. However, these head-worn audio systems are disposed either on or in the listener's ears. As such, current head-worn audio systems transmit tactile signals to the listener's brain resulting from the physical contact between the head-worn audio systems and the listener's ears. These tactile signals can lead to a psychoacoustic effect that suggests to the listener that the sounds generated by the head-worn audio systems emanate from a short distance to the listener's ears. Consequently, spatialized audio produced by current head-worn audio systems may appear to emanate from a location different from that of the virtual object. Further, current head-worn audio systems do not address the user position and orientation requirements of current spatialized audio systems.

With improvements in home theater systems, traditional cinemas are losing audiences to home theaters. Accordingly, filmmakers and film companies are searching for improvements in motion picture technology. In a similar technology space, mixed media systems such as those found in theme park rides (i.e., DISNEY'S STAR TOURS) can add real life special effects such as lights and motion to 3-D film and spatialized audio. However, such systems are prohibitively expensive and are not individualized. Moreover, such mixed media systems do not address the inherent user position and orientation requirements of current spatialized audio systems.

Users of 3-D mixed media systems are typically required to wear glasses that facilitate perception of 3-D imagery. Such glasses may contain left and right lenses with different polarizations or color filters, as in traditional anaglyph stereoscopic 3-D systems. The 3-D mixed media system projects overlapping images with different polarizations or colors such that users wearing stereoscopic glasses will see slightly different images in their left and right eyes. The differences in these images are exploited to generate 3-D optical images.

Similarly, spatial audio systems can be worn on the heads of users. However, the above-described psychoacoustic effect reduces the effectiveness of current head-worn spatial audio systems, by affecting the perceived position of virtual audio sources rendered by the systems.

In summary, current spatialized audio systems have listener position and orientation restrictions, and psychoacoustic effects that limit their effectiveness in rendering spatial audio corresponding to a virtual object for moving listeners and for pluralities of listeners in a variety of positions and orientations. In addition, traditional 2-D and 3-D films, 2-D and 3-D video games and mixed media systems can benefit from individualization including spatialized audio for pluralities of moving users/viewers/listeners that address user position and orientation restrictions, and psychoacoustic effects.

SUMMARY

In one embodiment directed to a spatialized audio system includes a frame to be worn on a head of a user. The system also includes a plurality of speakers attached to the frame such that, when the frame is worn by the user, each of the plurality of speakers are disposed at a respective non-zero distance from the user's head, such that each of the plurality of speakers does not contact any surface of the user's head, including the user's ears. The system further includes a head pose sensor to collect head pose data of the user. Moreover, the system includes a head pose processor to determine a head pose of the user from the head pose data. In addition, the system includes a spatialized audio processor to generate spatialized audio data based on the determined head pose of the user, In one or more embodiments, the speakers generate sound corresponding to the generated spatialized audio data. The system may also include one or more amplifiers coupled (e.g., tightly coupled) to a plurality of speakers. The amplifiers may be smart amplifiers that monitor the current and voltage applied to the speakers and are configured to avoid overdriving the speakers.

In one or more embodiments, the generated spatialized audio data includes position, orientation and volume data for each of a plurality of virtual audio sources. The plurality of speakers may focus the generated sound to the user's ears. Each of the plurality of speakers may include a transducer.

In one or more embodiments, the frame focuses the generated sound to the user's ears. The frame may include an acoustic waveguide to direct the generated sound to the user's ears.

In one or more embodiments, the head pose sensor is an IMU and/or a visual odometry system. The plurality of speakers may be removably attached to the frame. The plurality of speakers may be removably attached to the frame with respective magnets.

In one or more embodiments, the system also includes a cinema audio processor operatively coupled to the spatialized audio processor, where the cinema audio processor generates cinema audio data. The system further includes a plurality of cinema speakers to generate cinema sound corresponding to the generated cinema audio data.

In one or more embodiments, the spatialized audio processor receives timing information/metadata from the cinema audio processor to synchronize the sound with the cinema sound. The timing information may include a time code and/or a cue. The system can also include a wireless network, where the cinema audio processor transmits the timing information to the spatialized audio processor over the wireless network. The timing information may also include an optical cue in a video corresponding to the generated cinema sound. The timing information may also include an optical cue projected separately from a video corresponding to the generated cinema sound. The timing information may also include an optical cue projected with infrared light.

In one or more embodiments, the cinema audio processor transmits cinema information to the spatialized audio processor. The cinema information may include one of timing information, virtual object sound information, position information, orientation information, a hyperlink, or acoustic modeling information. The virtual object sound information may include a mono audio stream.

In one or more embodiments, the spatialized audio processor receives first timing information from the cinema audio processor at a first time to synchronize the sound with the cinema sound at the first time, and the spatialized audio processor receives second timing information from the cinema audio processor at a second time later than the first time to synchronize the sound with the cinema sound at the second time.

In one or more embodiments, the spatialized audio processor generates the spatialized audio data from spatialized audio source data. The spatialized audio source data may be preloaded on the spatialized audio processor. The spatialized audio source data may be streamed to the spatialized audio processor. The streamed spatialized audio source data may be buffered/cached at the spatialized audio processor.

In one or more embodiments, the spatialized audio processor compensates for a latency difference between the spatialized audio processor/the plurality of speakers and the cinema audio processor/the plurality of cinema speakers.

In one or more embodiments, the system also includes a user sensor to collect user information for transmission to the cinema audio processor. The user sensor may be attached to the frame. The cinema audio processor may modify the cinema audio data based on the user information such that the cinema sound corresponds to the modified cinema audio data. The user information may include a sampled sound from the user, and where the modified cinema audio data incorporates sampled sound.

In one or more embodiments, the plurality of cinema speakers includes a subwoofer configured to generate low frequency sound. The user information includes low frequency audio data. The cinema audio processor modifies the cinema audio data based on the low frequency audio data, where the subwoofer generates the low frequency sound corresponding to the modified cinema audio data. The subwoofer may be disposed adjacent a seat for the user. The subwoofer may be worn by the user.

In one or more embodiments, the system also includes an application processor operatively coupled to the spatialized audio processor to provide source data from which the spatialized audio processor generates the spatialized audio data. The application processor may be operatively coupled to the cinema audio processor. The application processor may synchronize the spatialized audio data with the cinema audio data. The cinema audio data may be organized in a branch structure, where modified cinema audio data has a modified branch structure smaller than the branch structure of the cinema audio data.

In one or more embodiments, the system also includes a microphone attached to the frame to record the cinema sound. The system further includes a synchronization module operatively coupled to the spatialized audio processor, where the synchronization module analyzes the recorded cinema sound to identify a cinema soundtrack and a time in the cinema soundtrack. The synchronization module also generates timing information based on an identity of the cinema soundtrack and the identified time in the cinema soundtrack to synchronize the sound with the cinema sound. The microphone may record the cinema sound at a later time during playback of the cinema sound, where the synchronization module analyzes the later recorded cinema sound to identify a later time in the cinema soundtrack to maintain synchronization between the sound and the cinema sound.

In one or more embodiments, the system also includes a cinema soundtrack database, where the synchronization module compares the recorded cinema sound to the cinema soundtrack database to identify the cinema soundtrack and the time in the cinema soundtrack. The synchronization module may identify a first match between a first recorded packet from the recorded cinema sound and a first database packet from the cinema soundtrack database. The synchronization module may identify a second match between a second recorded packet from the recorded cinema sound and a second database packet from the cinema soundtrack database after the synchronization module identifies the first match.

In one or more embodiments, the cinema soundtrack database includes a plurality of tonal clusters. The cinema soundtrack database may include an identifier corresponding to a tonal cluster, a respective time in the cinema soundtrack, and a sequence of tonal clusters following the tonal cluster. The synchronization module may compare the recorded cinema sound to the cinema soundtrack database includes matching tonal clusters in the recorded cinema sound with tonal clusters in the cinema soundtrack database. Each tonal cluster of the plurality of tonal clusters may be about 1 ms long.

In one or more embodiments, the system also includes a cinema soundtrack database builder to scan the cinema soundtrack and identify the plurality of tonal clusters therein. The timing information may include time codes.

In one or more embodiments, a spatialized audio system includes a plurality of personal audio devices. Each personal audio device of the plurality includes a frame to be worn on the head of a user. Each personal audio device also includes a plurality of speakers attached to the frame such that, when the frame is worn by the user, each of the plurality of speakers are disposed at a respective non-zero distance from the user's head, such that each of the plurality of speakers does not contact the user's head, including the user's ears. Each personal audio device further includes a head pose sensor to collect head pose data of the user. Moreover, each personal audio device includes a head pose processor to determine a head pose of the user from the head pose data.

In addition, each personal audio device includes a spatialized audio processor to generate spatialized audio data based on the determined head pose and a characteristic of the user. The system also includes a cinema audio processor operatively coupled to the spatialized audio processor, where the cinema audio processor generates cinema audio data. The system further includes a plurality of cinema speakers to generate cinema sound corresponding to the generated cinema audio data. Each of the plurality of speakers generates sound corresponding to respective generated spatialized audio data.

In one or more embodiments, a first generated spatialized audio data for a first user of a first personal audio device of the plurality of personal audio devices is different from a second generated spatialized audio data for a second user of a second personal audio device of the plurality of personal audio devices because a first characteristic of the first user is different from a second characteristic of the second user. The first and second characteristics may be different levels in a game. The first and second characteristics may be different personal preferences. The first and second characteristics may be different locations of user focus. The first and second characteristics may be different locations in a theater. The first and second characteristics may be different indicators of attention. The first and second characteristics may be different sounds emitted by the first and second users, respectively.

In one or more embodiments, the system also includes a room sensor to measure an acoustic property of a room in which the user is disposed, where the spatialized audio processor generates the spatialized audio data based on the determined head pose of the user and the measured acoustic property of the room. The room sensor may be a microphone to collect room sounds to measure the acoustic property of the room. The room sensor may be a camera to collect a room image to measure the acoustic property of the room.

In another embodiment, an AR/MR system includes a display system to generate virtual images. The system also includes the spatialized audio system described above. The virtual images and the generated sound are synchronized.

In one or more embodiments, the generated sound appears to emanate from a virtual object. The generated sound may appear to emanate from a real physical object. The generated sound may appear to emanate from a real physical person. The generated sound may appear to emanate from the real physical person's mouth. The generated sound may be different from the real physical person's real voice. The generated sound may appear to emanate from multiple sources around the user. The generated sound may appear to emanate from within the user.

In still another embodiment, a personalized media system includes a general media system, which includes a general media processor to generate general video and audio data corresponding to a media product. The general media system also includes a general media display to present a general light field corresponding to the general video data. The general media system further includes a plurality of general media speakers to present a general sound field corresponding to the general cinema audio data. The personalized media system also includes a plurality of personal media devices. Each personal media device of the plurality includes a pose sensor to collect pose data of the user. Each personal media device also includes a pose processor to determine a pose of the user from the pose data. Each personal media device further includes a personal media processor to generate personal video and audio data based on the determined pose and a characteristic of the user.

Moreover, each personal media device includes a frame to be worn on the head of a user. In addition, each personal media device includes a personal display attached to the frame and configured to present a personal three-dimensional light field for the user corresponding to the personal video data. Each personal media device also includes a plurality of personal speakers attached to the frame such that, when the frame is worn by the user, each of the plurality of personal speakers are disposed at a respective non-zero distance from the user's head, such that each of the plurality of personal speakers does not contact the user's head, including the user's ears. The plurality of personal speakers is configured to present a personal spatialized sound field for the user corresponding to the personal audio data. Each of the plurality of personal media devices is synchronized with the general media system such that the respective personal three-dimensional light field, personal spatialized sound field, the general media light field and the general media sound field form a coherent media experience for the user.

In one or more embodiments, the media product is a cinema product, a gaming product, and/or a mixed-media product. The characteristic of the user may be an identity of the user and/or a location of the user. The characteristic of the user may be related to the user's interaction with software related to the media.

In one or more embodiments, the media product is a cinema product and the software is a game. The pose of the user may be a head pose. The personal display may be an AR/MR display. The general media processor may be configured to modify the general video data such that a portion of the general light field is emptied, where the portion of the general light field corresponds to a location of an object in the personal three-dimensional light field.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
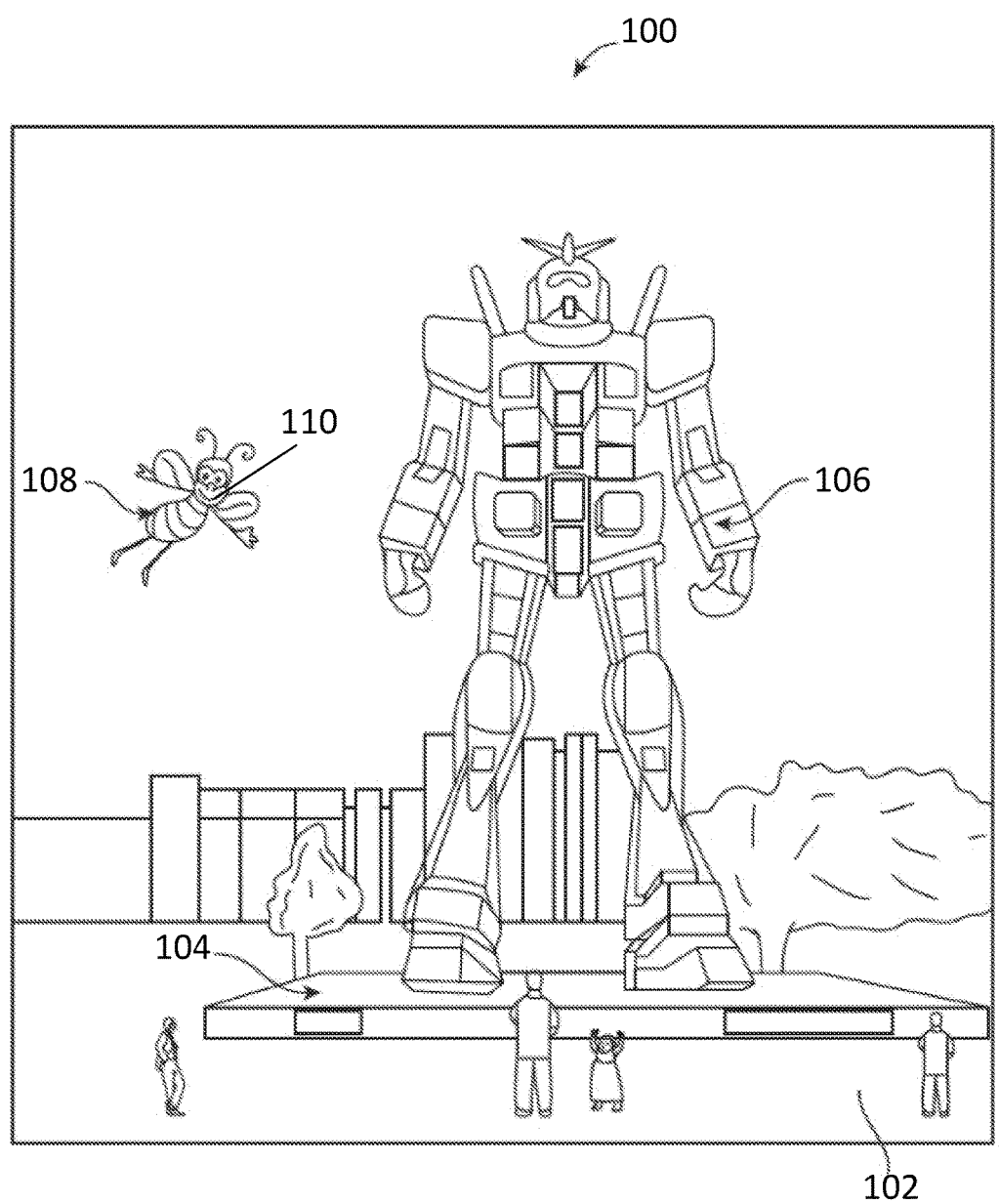
FIG. 1 depicts a user's view of augmented reality or mixed reality (AR or MR) through a wearable AR/MR user device according to one embodiment.

Various embodiments of the invention are directed to systems, methods, and articles of manufacture for spatialized audio systems in a single embodiment or in multiple embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The spatialized audio systems may be implemented independently of VR/AR/MR systems, but many embodiments below are described in relation to AR/MR systems for illustrative purposes only.

Summary of Problems and Solutions

Spatialized audio systems, such as those for use with or forming parts of 2-D/3-D cinema systems, 2-D/3-D video games and VR/AR/MR systems, render, present and emit spatialized audio corresponding to virtual objects with virtual locations in real and physical 3-D space. As used in this application, "emitting" or "presenting" audio includes, but is not limited to, causing formation of sound waves that may be perceived by the human auditory system as sound (including sub-sonic low frequency sound waves). These virtual locations are typically "known" to (i.e., recorded in) the spatialized audio system using a coordinate system (e.g., a coordinate system with the spatialized audio system at the origin and a known orientation relative to the spatialized audio system). Virtual audio sources associated with virtual objects have content, position and orientation. Another characteristic of virtual audio sources is volume, which falls off as a square of the distance from the listener. However, current spatialized audio systems (e.g., 5.1 spatialized audio systems, 7.1 spatialized audio systems, cinema audio systems and head-worn audio systems) all have listener position and orientation restrictions that limit the number and characteristics of listeners for which the spatialized audio systems can generate realistic spatialized audio. In addition, current head-worn audio systems cause a psychoacoustic effect in wearers that further hampers the acoustic imaging ability of the head-worn audio systems.

The spatialized audio systems described herein track a position of a listener to more accurately render spatialized audio such that audio associated with various virtual objects appear to originate from virtual positions corresponding to the respective virtual objects. Further, the spatialized audio systems described herein track a head pose of a listener to more accurately render spatialized audio such that directional audio associated with various virtual objects appear to propagate in virtual directions appropriate for the respective virtual objects (e.g., out of the mouth of a virtual character, and not out of the back of the virtual characters' head). Moreover, the spatialized audio systems described herein include other real physical and virtual objects in their rendering of spatialized audio such that audio associated with various virtual objects appear to appropriately reflect off of the real physical and virtual objects. In addition, the spatialized audio systems include speakers attached to a frame worn by the listener such that the speakers are disposed at respective nonzero distances (e.g., in the approximately 1 cm range) from the listener's ears to prevent the psychoacoustic effect that negatively impacts acoustic imaging. In certain embodiments the speakers are disposed at a distance between 3 mm and 3 cm from the user's ears.

Traditional cinema, whether 2-D or 3-D, is losing its audience to ever improving home theater systems, including improved home spatialized audio systems. Utilizing the spatialized audio systems and augmented reality systems described herein, traditional cinema can be augmented with synchronized spatialized audio imaging and AR/MR to enhance the cinema experience and individualize/customize content to personalize the cinema experience. Individualized cinema offers a new experience that incorporates available data corresponding to the user, increasing the entertainment value of cinema, gaming and mixed media systems.

Spatialized Audio Systems

AR/MR scenarios often include presentation of images and sound corresponding to virtual objects in relationship to real-world objects. For example, referring to FIG. 1, an augmented reality scene 100 is depicted wherein a user of an AR/MR technology sees a real-world, physical, park-like setting 102 featuring people, trees, buildings in the background, and a real-world, physical concrete platform 104. In addition to these items, the user of the AR/MR technology also perceives that he "sees" a virtual robot statue 106 standing upon the real-world, physical platform 104, and a virtual cartoon-like avatar character 108 flying by which seems to be a personification of a bumblebee, even though these virtual objects 106, 108 do not exist in the real world.

In order to present a believable or passable AR/MR scene 100, the virtual objects (e.g., the robot statue 106 and the bumblebee 108) may have synchronized spatialized audio respectively associated therewith. For instance, mechanical sounds associated with the robot statue 106 may be generated so that they appear to emanate from the virtual location corresponding to the robot statue 106. Similarly, a buzzing sound associated with the bumblebee 108 may be generated so that they appear to emanate from the virtual location corresponding to the bumblebee 108.

The spatialized audio may have an orientation in addition to a position. For instance, a "cartoonlike" voice associated with the bumblebee 108 may appear to emanate from the mouth 110 of the bumblebee 108. While the bumblebee 108 is facing the viewer/listener in the scenario depicted in FIG. 1, the bumblebee 108 may be facing away from the viewer/listener in another scenario such as one in which the viewer/listener has moved behind the virtual bumblebee 108. In that case, the voice of the bumblebee 108 would be rendered as a reflected sound off of other objects in the scenario (e.g., the robot statue 106).

In some embodiments, virtual sound may be generated so that it appears to emanate from a real physical object. For instance, virtual bird sound may be generated so that it appears to originate from the real trees in the AR/MR scene 100. Similarly, virtual speech may be generated so that it appears to originate from the real people in the AR/MR scene 100. In an AR/MR conference, virtual speech may be generated so that it appears to emanate from a real person's mouth. The virtual speech may sound like the real person's voice or a completely different voice. In one embodiment, virtual speech may appear to emanate simultaneously from a plurality of sound sources around a listener. In another embodiment virtual speech may appear to emanate from within a listener's body.

In a similar manner, VR scenarios can also benefit from more accurate and less intrusive spatialized audio generation and delivery while minimizing psychoacoustic effects. Like AR/MR scenarios, VR scenarios must also account for one or more moving viewers/listeners units rendering of spatialized audio. Accurately rendering spatialized audio in terms of position, orientation and volume can improve the immersiveness of VR scenarios, or at least not detract from the VR scenarios.

Figure 2:
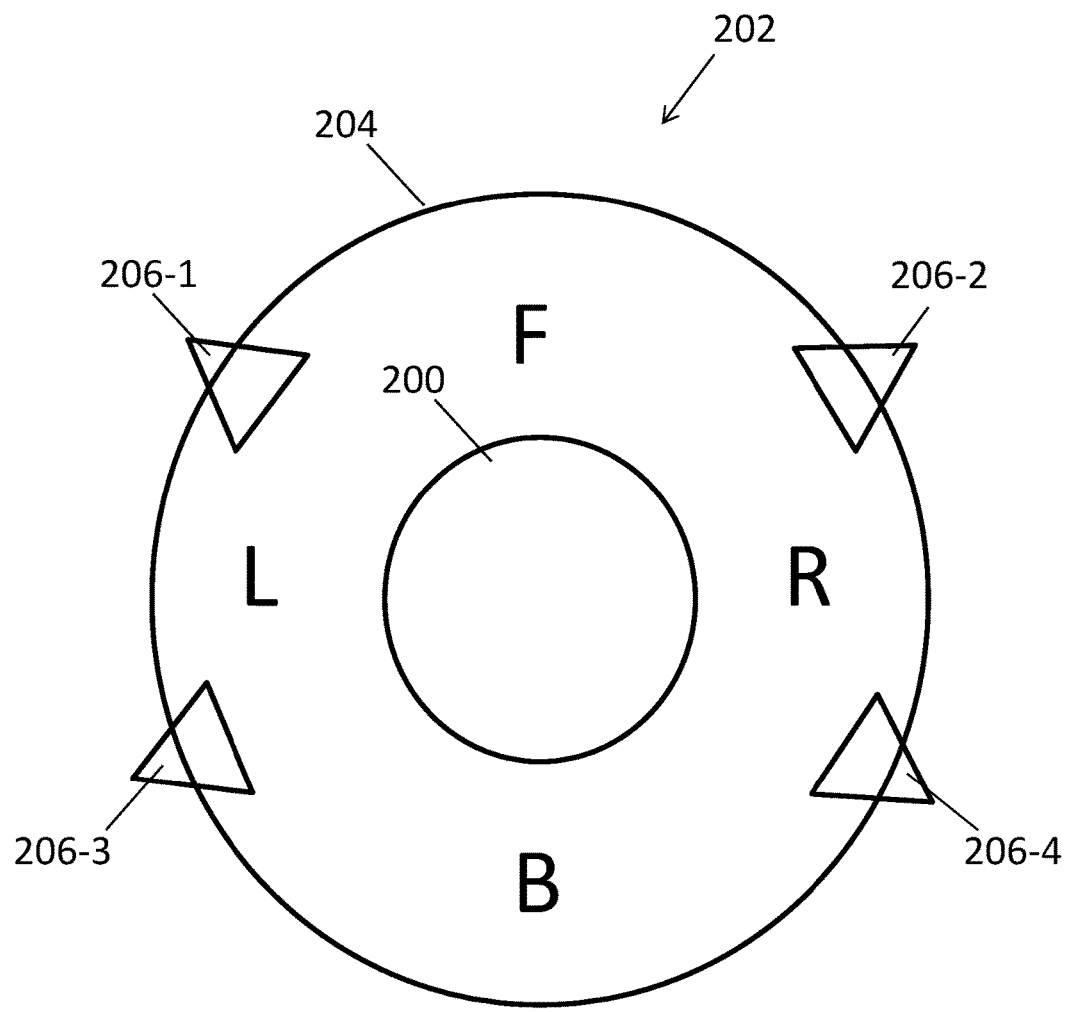
FIG. 2 is a top schematic view of a spatialized audio system according to one embodiment worn on a user/listener's head.

FIG. 2 schematically depicts a spatialized audio system 202 worn on a listener's head 200 in a top view from above the listener's head 200. As shown in FIG. 2, the spatialized audio system 202 includes a frame 204 and four spatialized audio system speakers 206-1, 206-2, 206-3, 206-4 attached to the frame 204. Spatialized audio system speaker 206-1 is attached to the frame 204 such that, when the spatialized audio system 202 is worn on the listener's head 200, speaker 206-1 is forward F and to the left L of the listener's head 200. Spatialized audio system speaker 206-2 is attached to the frame 204 such that, when the spatialized audio system 202 is worn on the listener's head 200, speaker 206-2 is forward F and to the right R of the listener's head 200. Spatialized audio system speaker 206-3 is attached to the frame 204 such that, when the spatialized audio system 202 is worn on the listener's head 200, speaker 206-3 is behind B and to the left L of the listener's head 200. Spatialized audio system speaker 206-4 is attached to the frame 204 such that, when the spatialized audio system 202 is worn on the listener's head 200, speaker 206-4 is behind B and to the right R of the listener's head 200. All of the spatialized audio system speakers 206-1, 206-2, 206-3, 206-4 are pointed toward the listener's head 200. The spatialized audio system speaker placement depicted in FIG. 2 facilitates generation of spatialized audio.

As used in this application, "speaker," includes but is not limited to, any device that generates sound, including sound outside of the typical humans hearing range. Because sound is basically movement of air molecules, many different types of speakers can be used to generate sound. One or more of the spatialized audio system speakers 206-1, 206-2, 206-3, 206-4 depicted in FIG. 2 can be a conventional electrodynamic speaker or a vibration transducer that vibrates a surface to generate sound. In embodiments including vibration transducers, the transducers may vibrate any surfaces to generate sound, including but not limited to, the frame 204 and the skull of the listener. The spatialized audio system speakers 206-1, 206-2, 206-3, 206-4 may be removably attached to the frame 204 (e.g., magnetically) such that the speakers 206-1, 206-2, 206-3, 206-4 may be replaced and/or upgraded.

Figure 3:
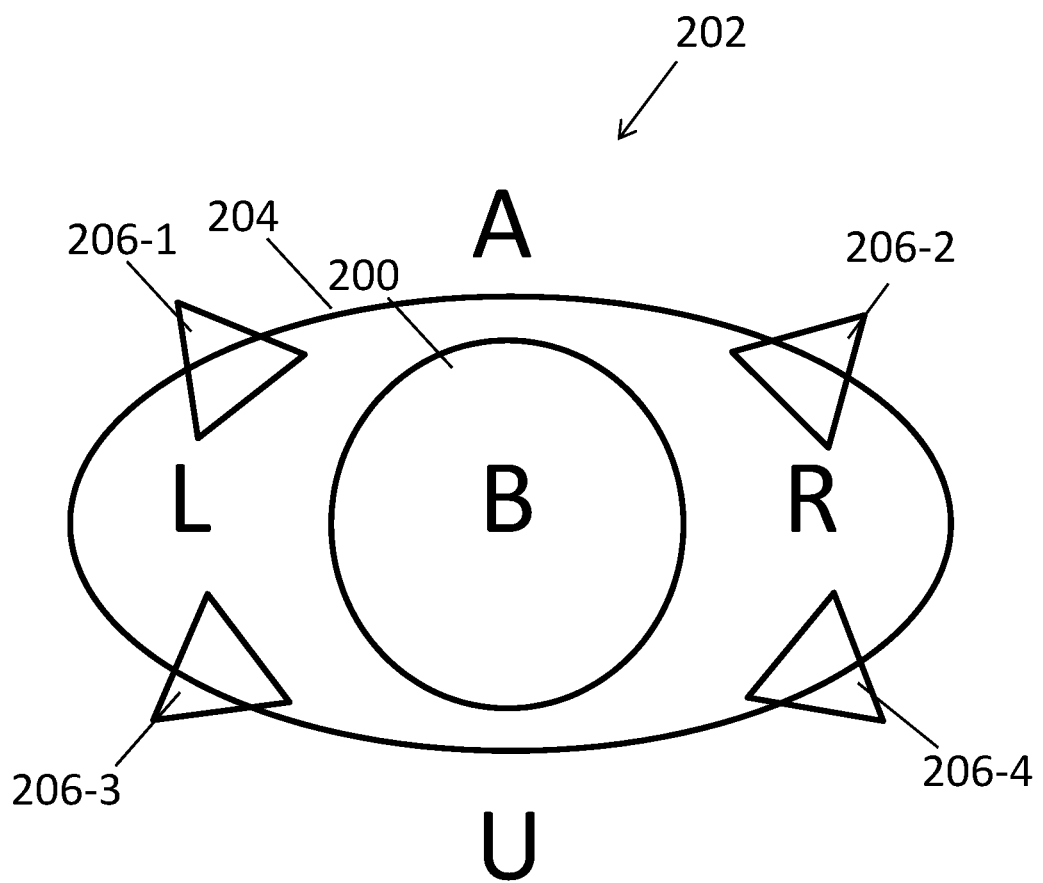
FIG. 3 is a back schematic view of the spatialized audio system worn on the user/listener's head as depicted in FIG. 2.

FIG. 3 schematically depicts the spatialized audio system 202 depicted in FIG. 2 from a back view behind the listener's head 200. As shown in FIG. 3, the frame 204 of the spatialized audio system 202 may be configured such that when the spatialized audio system 202 is worn on the listener's head 200, the front of the frame 204 is above A the listener's head 200 and the back of the frame 204 is under U listener's head 200. Because the four spatialized audio system speakers 206-1, 206-2, 206-3, 206-4 of the spatialized audio system 202 are attached to the frame 204, the speakers are also disposed above A 206-1, 206-2 and under U 206-3, 206-4 the listener's head 200, when the spatialized audio system 202 is worn on the listener's head 200. The spatialized audio system speaker placement depicted in FIG. 3 facilitates generation of spatialized audio, especially spatialized audio including virtual audio sources located in planes above A and under U the listener's head 200.

Figure 4:
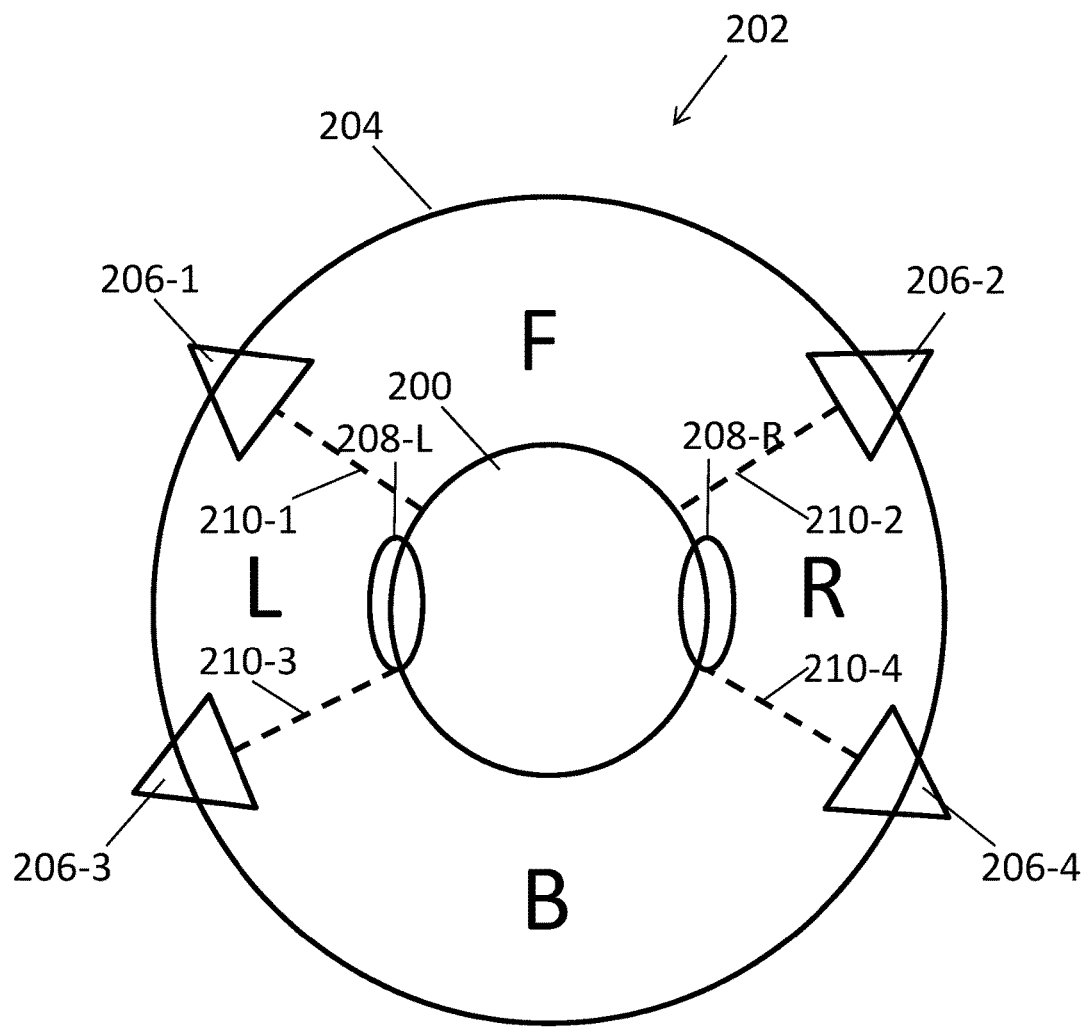
FIG. 4 is a more detailed top schematic view of the spatialized audio system worn on the user/listener's head as depicted in FIG. 2.

While it has been stated that the spatialized audio system speakers 206-1, 206-2, 206-3, 206-4 are pointed toward the listener's head 200, it is more accurate to describe the speakers 206-1, 206-2, 206-3, 206-4 as being pointed toward the listener's ears 208-L, 208-R, as shown in FIG. 4. FIG. 4 is a top view similar to the one depicted in FIG. 2. Spatialized audio system speakers 206-1, 206-3 are pointed toward the listener's left ear 208-L. Spatialized audio system speakers 206-2, 206-4 are pointed toward the listener's right ear 208-R. Pointing the spatialized audio system speakers 206-1, 206-2, 206-3, 206-4 toward the listener's ears 208-L, 208-R minimizes the volume needed to render the spatialized audio for the listener. This, in turn, reduces the amount of sound leaking from the spatialized audio system 202 (i.e., directed toward unintended listeners). The frame 204 may also be configured to focus the spatialized audio toward the listener's ears 208-L, 208-R. For instance, the frame 204 may include or form an acoustic waveguide to direct the spatialized audio.

FIG. 4 also illustrates that the spatialized audio system speakers 206-1, 206-2, 206-3, 206-4 are attached to the frame 204 such that, when the spatialized audio system 202 is worn on the listener's head 200, the speakers 206-1, 206-2, 206-3, 206-4 are located at respective non-zero distances 210-1, 210-2, 210-3, 210-4 from the listener's head 200. As used in this application, "non-zero distance," includes but is not limited to, any distance that prevents noticeable contact between two surfaces. For instance, a speaker 206 being located at a "non-zero distance" from a listener's/user's head 200 means that the shortest distance between the speaker and the listener's/user's head 200 is such that there is no contact between the speaker 206 and the listener's/user's head 200. The listener's/user's head 200 includes the listener's ears 208-L, 208-R (see distances 210-3, 210-4).

While the system 202 in FIGS. 2 to 4 includes four spatialized audio system speakers 206-1, 206-2, 206-3, 206-4, other spatialized audio systems may include fewer or more spatialized audio system speakers.

Figure 5:
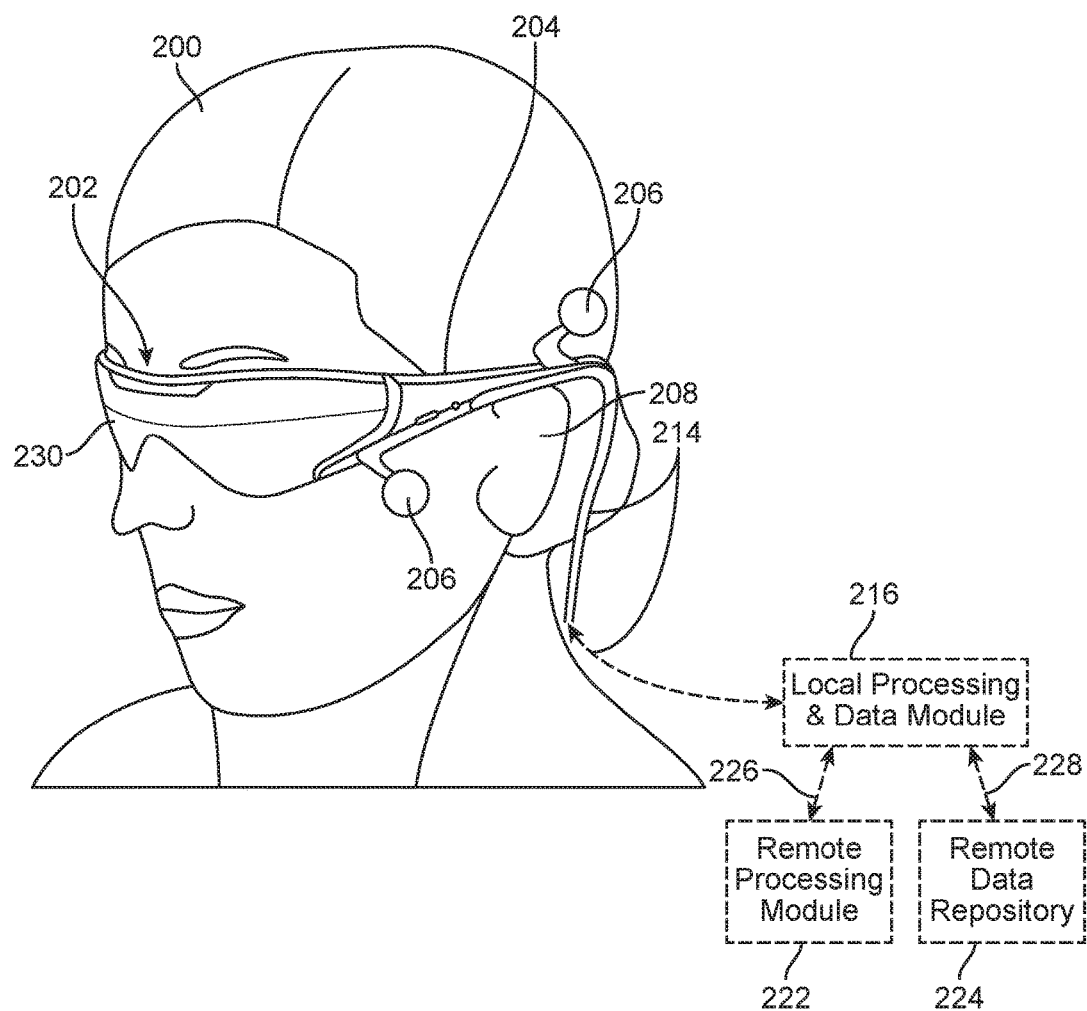
FIGS. 5 to 8 are partial perspective and partial schematic views of spatialized audio systems worn on a user/listener's head according to various embodiments.

Referring now to FIGS. 5 to 8, some exemplary spatialized audio system component options are illustrated. As shown in FIG. 5, a head-mounted spatialized audio system 202, including a frame 204 coupled to a plurality of spatialized audio system speakers 206, is worn by a listener on a listener's head 200. The following describes possible components of an exemplary spatialized audio system 202. The described components are not all necessary to implement a spatialized audio system 202.

The two spatialized audio system speakers 206 in the depicted spatialized audio system 202 are positioned at respective non-zero distances from the listener's head 200, such that the speakers 206 do not contact any surface of the listener's head 200. Although not shown in FIGS. 5 to 8, another pair of spatialized audio system speakers 206 is positioned at respective non-zero distances from the listener's head 200 on the other side of the listener's head 206 to provide for spatialized sound. As such, this spatialized audio system 202 includes a total of four spatialized audio system speakers 206, like the systems depicted in FIGS. 2 to 4. Although the spatialized audio system speakers 206 in the spatialized audio systems 202 depicted in FIGS. 5, 7 and 8 are attached to respective frames 204, some or all of the speakers 206 of the spatialized audio system 202 may be attached to or embedded in a helmet or hat 212 as shown in the embodiment depicted in FIG. 6.

Figure 6:
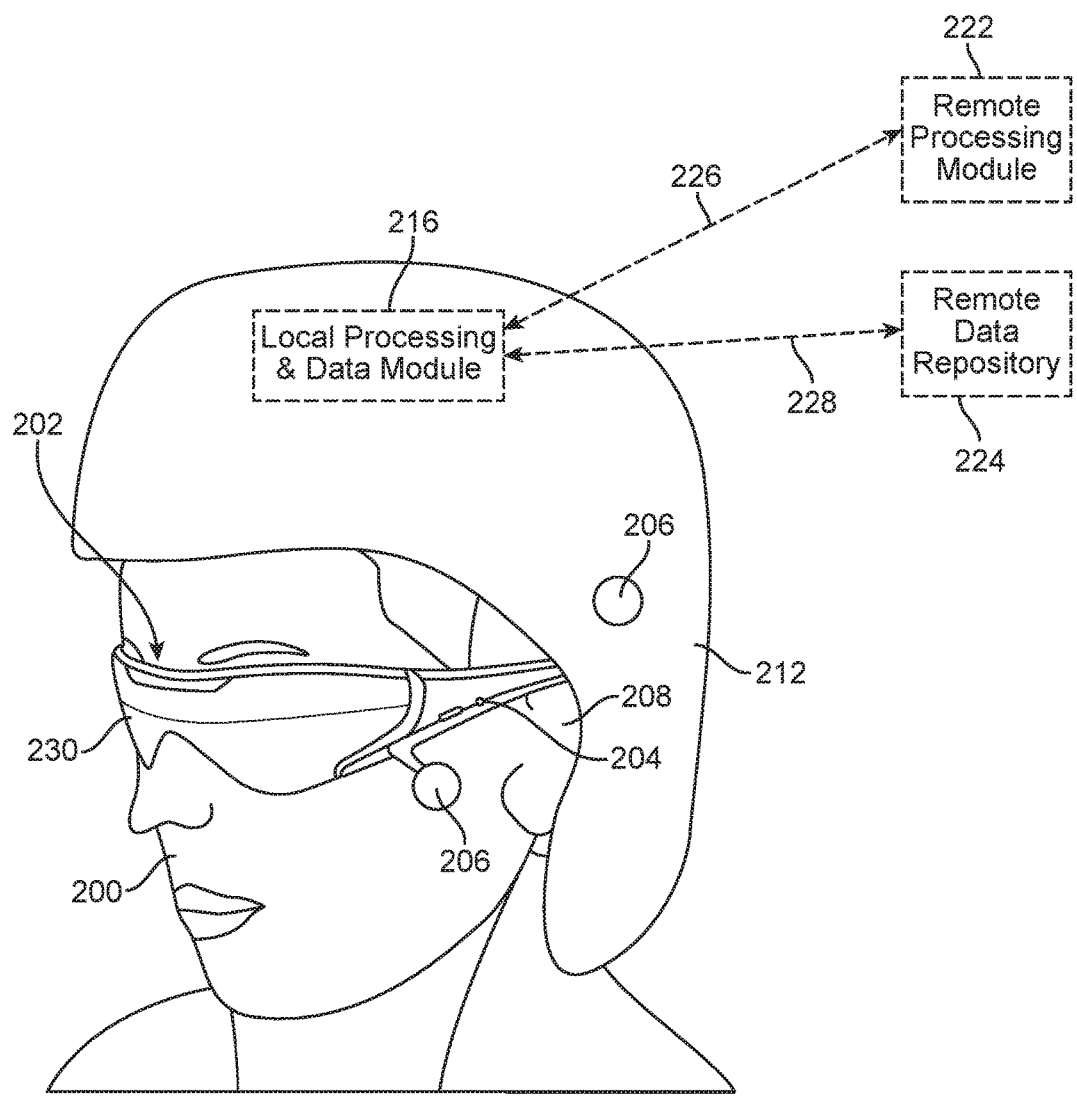
Figure 7:
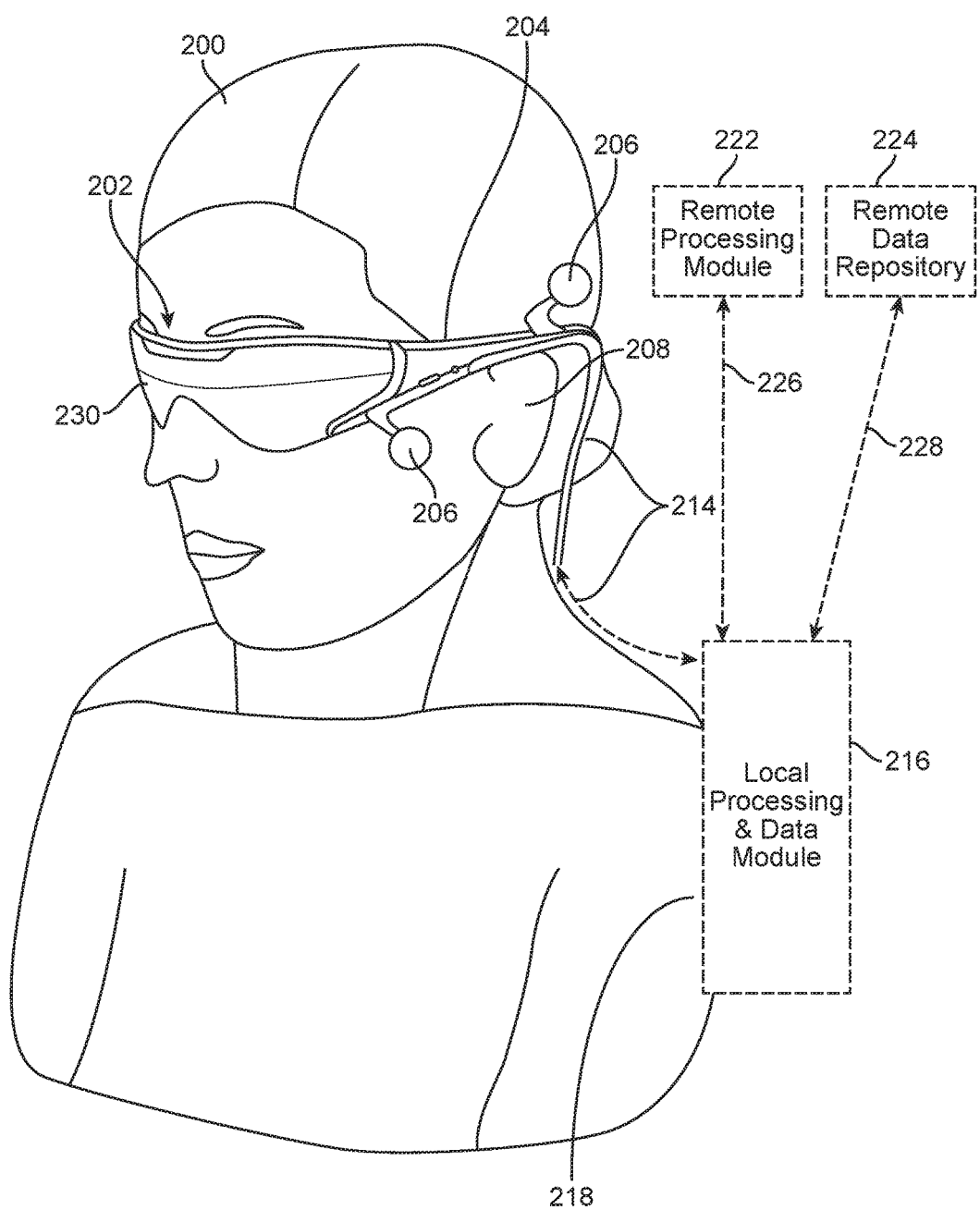
Figure 8:
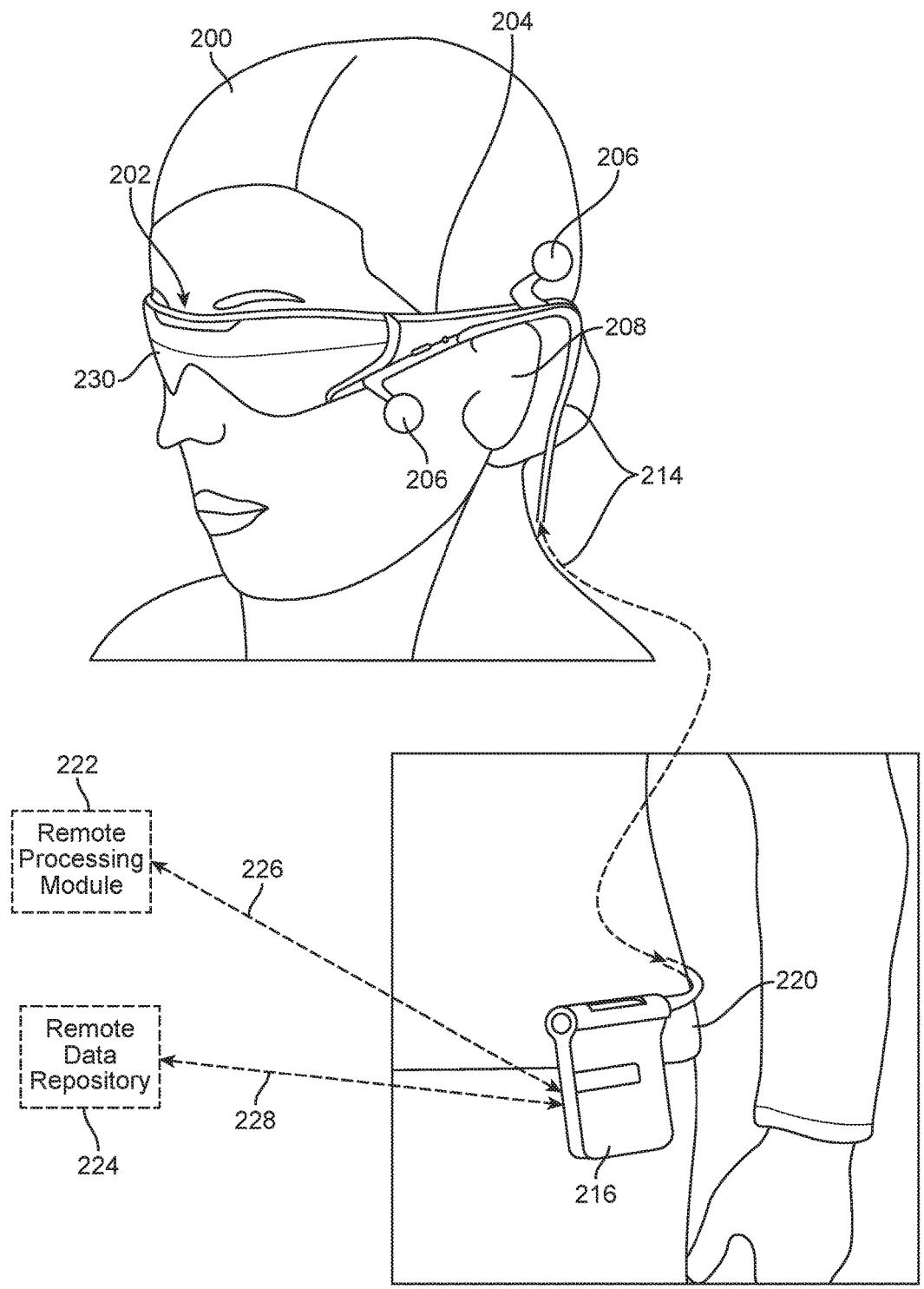

The spatialized audio system speakers 206 of the spatialized audio system 202 are operatively coupled, such as by a wired lead and/or wireless connectivity 214, to a local processing and data module 216, which may be mounted in a variety of configurations, such as fixedly attached to the frame 204, fixedly attached to/embedded in a helmet or hat 212 as shown in the embodiment depicted in FIG. 6, removably attached to the torso 218 of the listener in a backpack-style configuration as shown in the embodiment of FIG. 7, or removably attached to the hip 220 of the listener in a belt-coupling style configuration as shown in the embodiment of FIG. 8.

The local processing and data module 216 may comprise one or more power-efficient processor or controller, as well as digital memory, such as flash memory, both of which may be utilized to assist in the processing, caching, and storage of data. The data may be captured from sensors which may be operatively coupled to the frame 204, such as image capture devices (such as visible and infrared light cameras), inertial measurement units (including accelerometers and gyroscopes, "IMU"), compasses, microphones, GPS units, and/or radio devices. Alternatively or additionally, the data may be acquired and/or processed using a remote processing module 222 and/or remote data repository 224, possibly to facilitate/direct generation of sound by the speakers 206 after such processing or retrieval. The local processing and data module 216 may be operatively coupled, such as via a wired or wireless communication links 226, 228, to the remote processing module 222 and the remote data repository 224 such that these remote modules 222, 224 are operatively coupled to each other and available as resources to the local processing and data module 216.

In one embodiment, the remote processing module 222 may comprise one or more relatively powerful processors or controllers configured to analyze and process audio data and/or information. In one embodiment, the remote data repository 224 may comprise a relatively large-scale digital data storage facility, which may be available through the Internet or other networking configuration in a "cloud" resource configuration. In one embodiment, all data is stored and all computation is performed in the local processing and data module 216, allowing fully autonomous use from any remote modules.

In one or more embodiments, the spatialized audio system is typically fitted for a particular listener's head, and the spatialized audio system speakers are aligned to the listener's ears (e.g., ear 208). These configuration steps may be used in order to ensure that the listener is provided with an optimum spatialized audio experience without causing any physiological side-effects, such as headaches, nausea, discomfort, etc. Thus, in one or more embodiments, the listener-worn spatialized audio system is configured (both physically and digitally) for each individual listener, and a set of programs may be calibrated specifically for the listener. For example, in some embodiments, the listener worn spatialized audio system may detect or be provided with respective distances between spatialized audio system speakers of the head worn spatialized audio system and the listener's ears, and a 3-D mapping of the listener's head. All of these measurements may be used to provide a head-worn spatialized audio system customized to fit a given listener. In other embodiments, such measurements may not be necessary in order to perform the spatialized audio functions. For example, a loose fitting spatialized audio system may be used comfortably by a variety of listeners, although possibly with less accurate spatialization of virtual audio sources.

Although not needed to implement a spatialized audio system, a display 230 may be coupled to the frame 204 (e.g., for an optical AR/MR experience in addition to the spatial audio experience), as shown in FIGS. 5 to 8. Exemplary AR/MR displays are described in U.S. Utility patent application Ser. No. 14/738,877 and Ser. No. 14/555,585, the contents of which have been previously incorporated-by-reference herein. In embodiments including a display 230, the local processing and data module 216, the remote processing module 222 and the remote data repository 224 may process 3-D video data in addition to spatial audio data.

Figure 9:
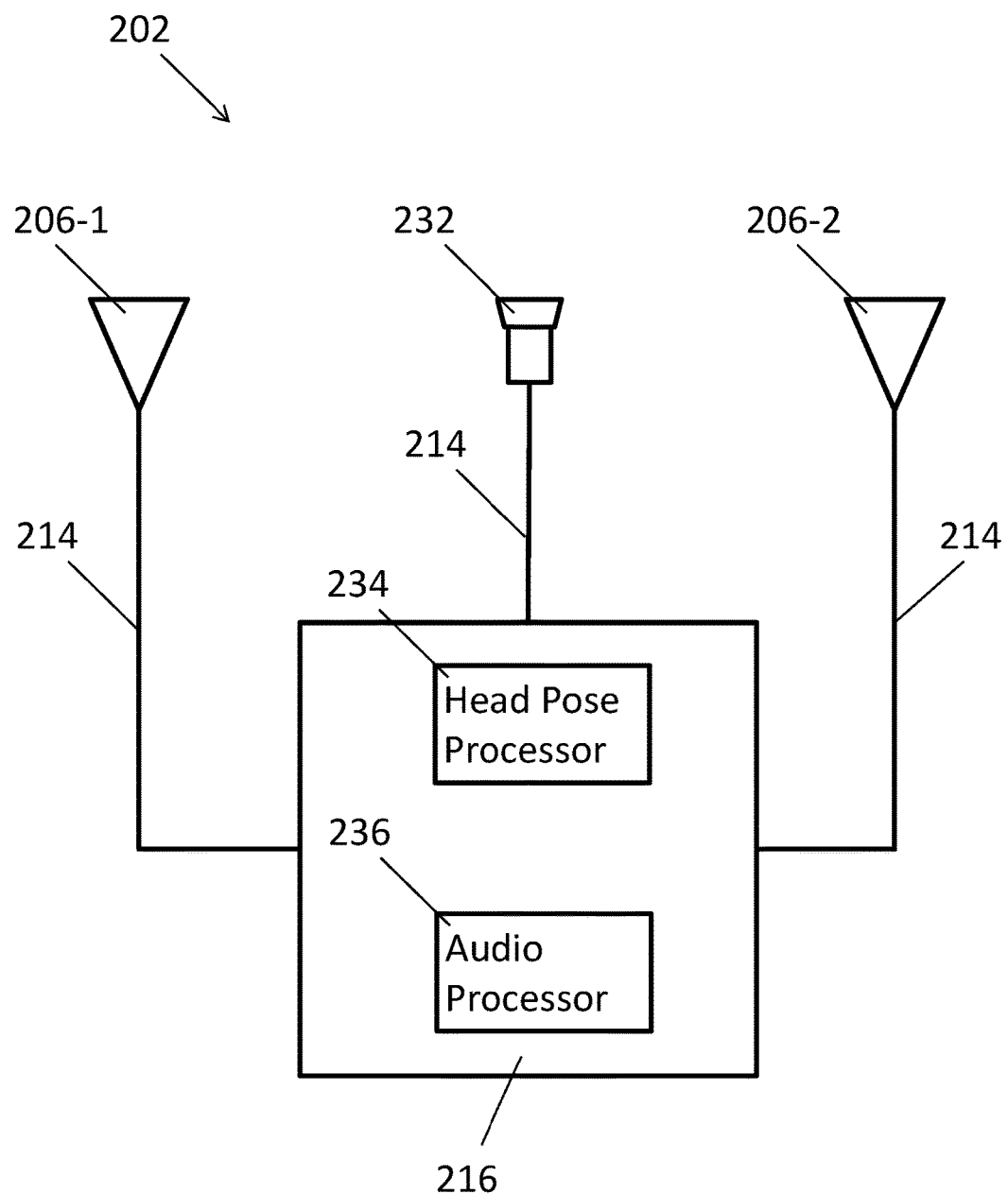
FIG. 9 is a detailed schematic view of a spatialized audio system according to one embodiment.

FIG. 9 depicts a spatialized audio system 202, according to one embodiment, including a plurality of spatialized audio system speakers 206-1, 206-2 operatively coupled to a local processing and data module 216 via wired lead and/or wireless connectivity 214. The spatialized audio system 202 also includes a head pose sensor 232 operatively coupled to the local processing and data module 216 via wired lead and/or wireless connectivity 214. The head pose sensor 232 is configured to collect head pose data of a listener/user. The head pose sensor 232 may include one or more of image capture devices (such as visible and infrared light cameras), inertial measurement units (including accelerometers and gyroscopes), compasses, microphones, GPS units, or radio devices. While the spatialized audio system 202 depicted in FIG. 9 includes only two spatialized audio system speakers 206-1, 206-2, spatialized audio systems according to other embodiments may include more speakers.

The spatialized audio system 202 further includes a head pose processor 234 to determine a head pose of a listener/user wearing the spatialized audio system 202 based on at least the head pose data collected by the head pose sensor 232. As used in this application, "head pose processor," includes, but is not limited to, one or more separate and independent software and/or hardware components of a computer that must be added to a general purpose computer before the computer can determine a head pose, and computers having such components added thereto.

The spatialized audio system 202 further includes a spatialized audio processor 236 to generate spatialized audio data for spatialized audio to be delivered to a listener/user wearing the spatialized audio system 202 based on at least the head pose determined by the head pose processor 234. The generated spatialized audio data may include content, position, orientation and volume data for each virtual audio source in a spatialized sound field. As used in this application, "audio processor," includes, but is not limited to, one or more separate and independent software and/or hardware components of a computer that must be added to a general purpose computer before the computer can generate spatialized audio data, and computers having such components added thereto. The spatialized audio processor 234 may also generate audio signals for the plurality of spatialized audio system speakers 206-1, 206-2 based on the spatialized audio data to deliver spatialized audio to the listener/user.

Figure 10:
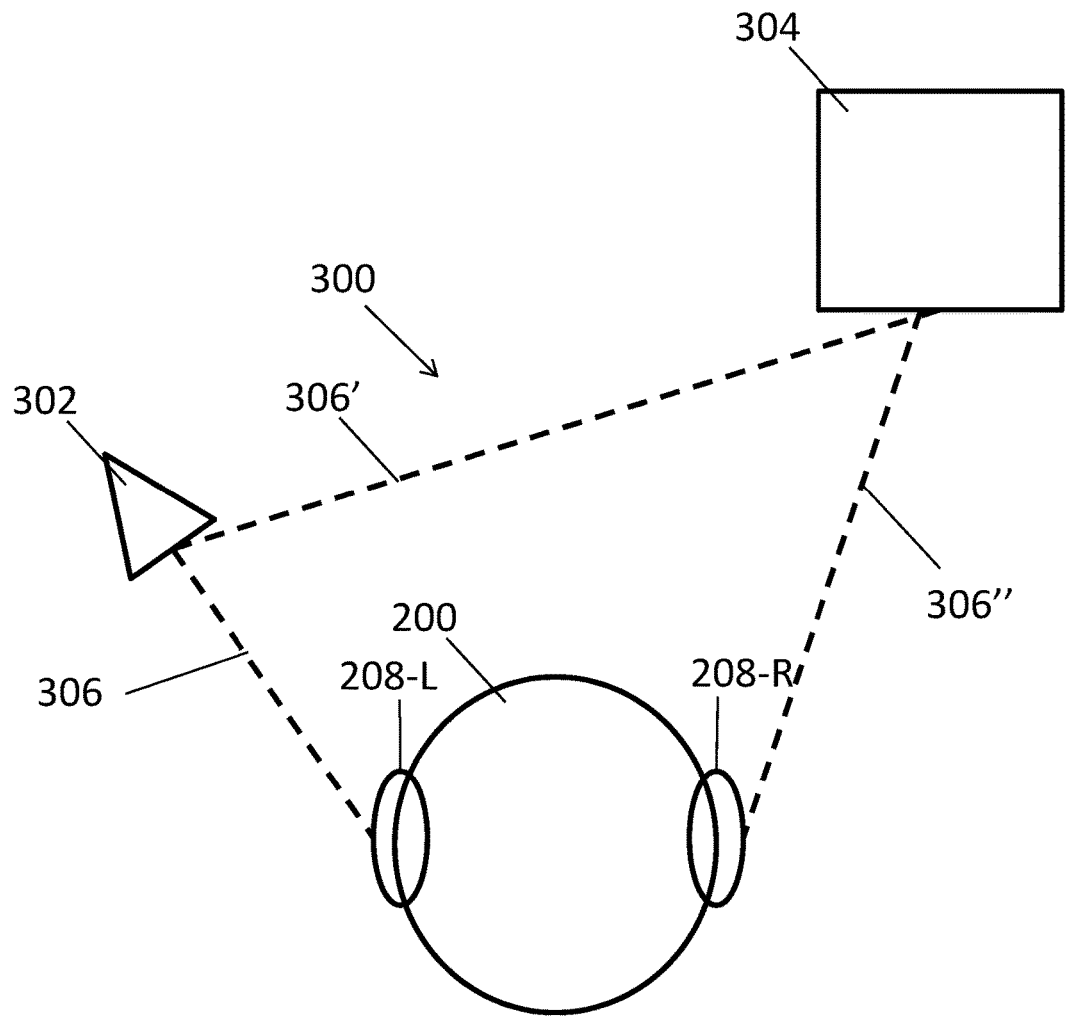
FIG. 10 is a schematic view of a spatialized sound field generated by a real physical audio source.

FIG. 10 depicts a spatialized sound field 300 as generated by a real physical audio source 302. The real physical sound source 302 has a location and an orientation. The real physical sound source 302 generates a sound wave having many portions. Due to the location and orientation of the real physical sound source 302 relative to the listener's head 200, a first portion 306 of the sound wave is directed to the listener's left ear 208-L. A second portion 306' of the sound wave is directed away from the listener's head 200 and toward an object 304 in the spatialized sound field 300. The second portion 306' of the sound wave reflects off of the object 304 generating a reflected third portion 306", which is directed to the listener's right ear 208-R. Because of the different distances traveled by the first portion 306 and second and third portions 306', 306" of the sound wave, these portions will arrive at slightly different times to the listener's left and right ears 208-L, 208-R. Further, the object 304 may modulate the sound of the reflected third portion 306" of the sound wave before it reaches the listener's right ear 208-R.

The spatialized sound field 300 depicted in FIG. 10 is a fairly simple one including only one real physical sound source 302 and one object 304. A spatialized audio system 202 reproducing even this simple spatialized sound field 300 must account for various reflections and modulations of sound waves. Spatialized sound fields with more than one sound source and/or more than on object interacting with the sound wave(s) therein are exponentially more complicated. Spatialized audio systems 202 must be increasingly powerful to reproduce these increasingly complicated spatialized sound fields. While the spatialized audio processor 236 depicted in FIG. 9 is a part of the local processing and data module 216, more powerful spatialized audio processor 236 in other embodiments may be a part of the remote processing module 222 in order to conserve space and power at the local processing and data module 216.

Figure 11:
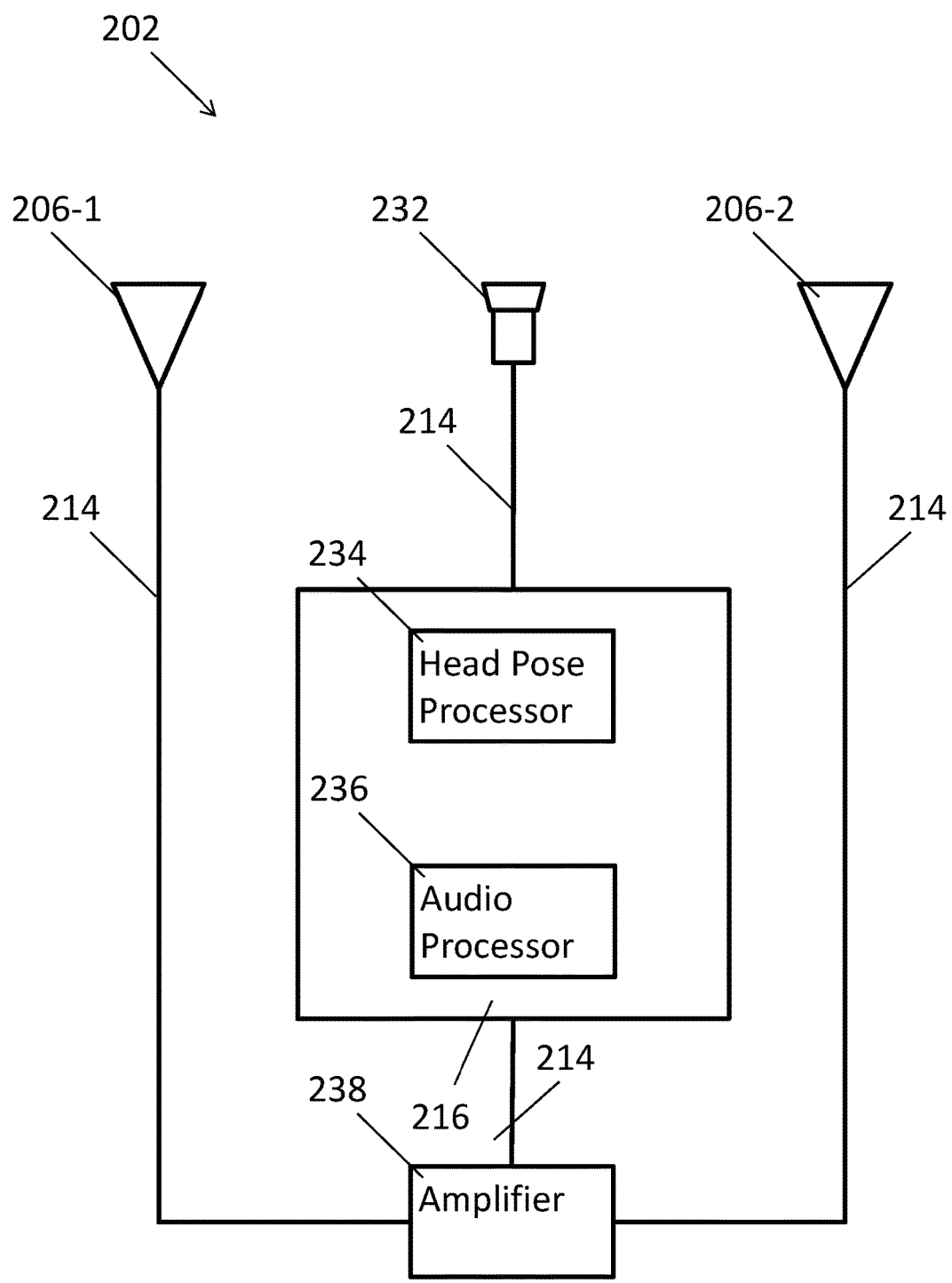
FIG. 11 is a detailed schematic view of a spatialized audio system according to another embodiment.

FIG. 11 depicts a spatialized audio system 202 according to another embodiment. The system 202 depicted in FIG. 10 is similar to the system 202 depicted in FIG. 9. The difference is that the spatialized audio system depicted in FIG. 10 includes an amplifier 238 operatively coupled to the local processing and data module 216 via a wired lead and/or wireless connectivity 214. Another difference is that the plurality of spatialized audio system speakers 206-1, 206-2 are operatively connected to the amplifier 238 via wired lead and/or wireless connectivity 214 instead of to the local processing and data module 216. The amplifier 238 generates audio signals for the plurality of spatialized audio system speakers 206-1, 206-2 based on the spatialized audio data from the local processing and data module 216 to deliver spatialized audio to a listener/user wearing the spatialized audio system 202. The amplifier 238 is tightly coupled to the plurality of spatialized audio system speakers 206-1, 206-2 such that the amplifier 238 monitors the spatialized audio system speaker 206-1, 206-2 when generating audio signals to minimize audio distortion and improve accuracy of audio reproduction.

Individualized Spatialized Cinema Audio and Video Experience

Figure 12:
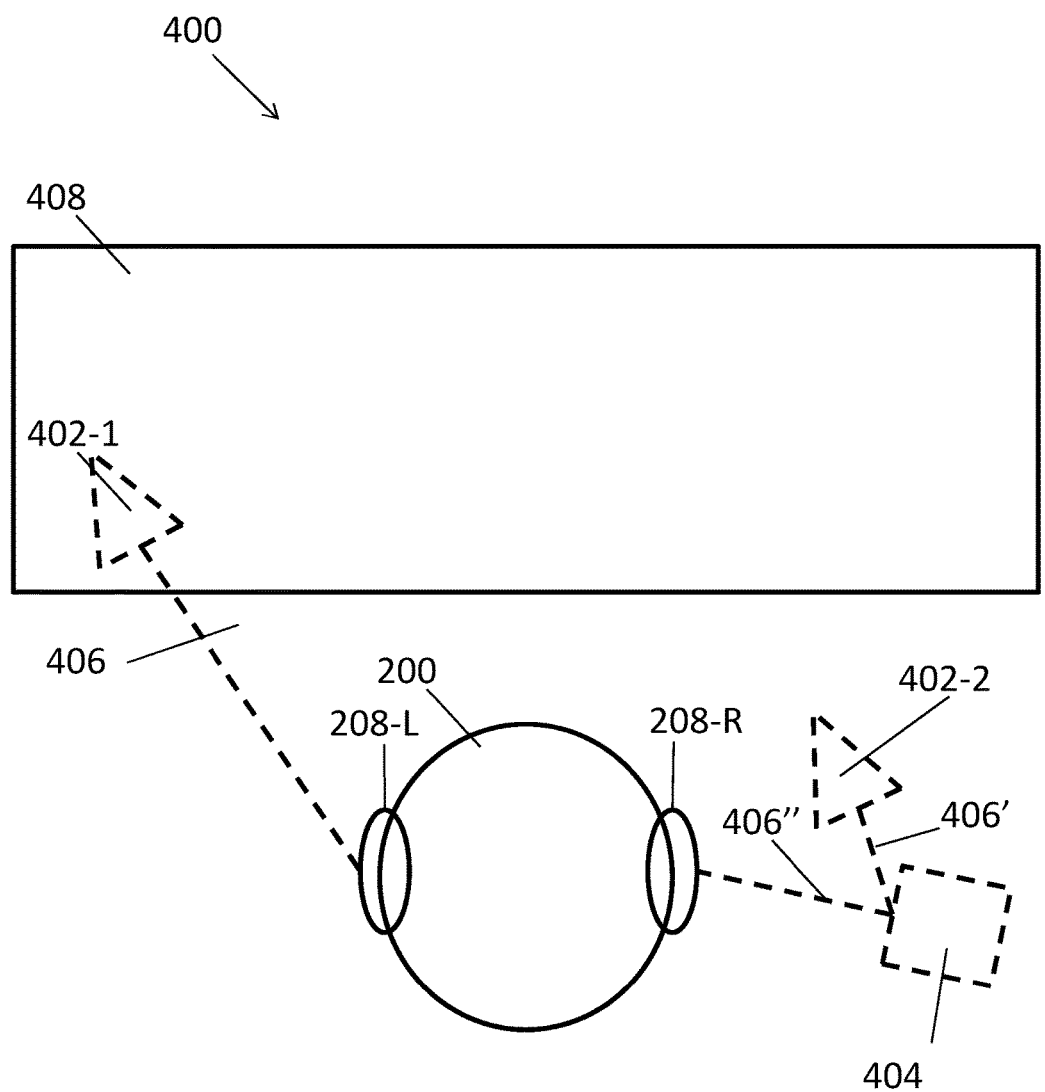
FIG. 12 is a back schematic view of a spatialized cinema audio experience including various virtual sound sources and a virtual object according to one embodiment.

FIG. 12 depicts, from a forward facing perspective view behind the listener/viewer/user's head 200, a spatialized cinema audio and video experience 400 according to one embodiment. In the spatialized cinema audio and video experience 400, a listener/viewer/user is positioned in a room for a cinema experience (e.g., a movie theater or a home cinema room). The spatialized cinema audio and video experience 400 includes first and second virtual audio sources 402-1, 402-2. These virtual audio sources 402-1, 402-2 correspond to visual information presented to the user using a cinema projector and an AR/MR display 230. For instance, first virtual audio source 402-1 may correspond to a character in a movie scene, and second virtual audio source 402-2 may correspond to a horn in a related AR/MR scene. The character in the movie scene may be displayed to the user on a cinema display/screen 408 and the horn may be displayed to the user on a display 230 coupled to the frame 204 of a spatialized audio/AR/MR system 202 (not shown in FIG. 12, see FIGS. 5 to 8). Alternatively, the character in the movie scene may be displayed to the user using traditional cinema 3-D technologies, such as anaglyph, polarized or shutter-based.

FIG. 12 also depicts a portion 406 of the sound wave corresponding to the first virtual audio source 402-1 (i.e., the virtual character), which is directed to the listener's left ear 208-L. FIG. 12 further depicts a first portion 406' of the sound wave corresponding to the second virtual audio source 402-2 (i.e., the horn), which is directed to a virtual object 404. The first portion 406' reflects off of the virtual object 404 forming a second portion 406", which is directed to listener's right ear 208-R.

Figure 13:
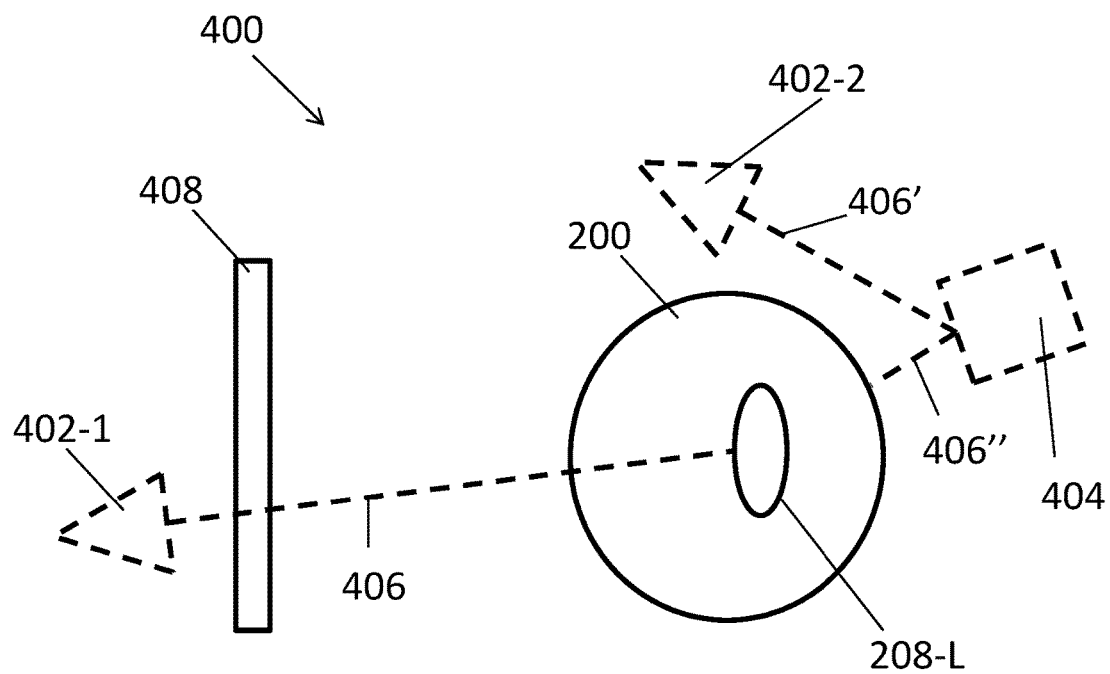
FIG. 13 is a side schematic view of the spatialized cinema audio experience depicted in FIG. 12.

FIG. 13 depicts, from a side view, the spatialized cinema audio and video experience 400 embodiment depicted in FIG. 12. FIG. 13 shows that the first virtual audio source 402-1 (i.e., the virtual character) is slightly below the listener's left ear 208-L, and behind the cinema display/screen 408. FIG. 13 also shows that the second virtual audio source 402-2 (i.e., the horn) is slightly above the listener's right ear 208-R, and the virtual object 404 has a height between the listener's right ear 208-R and the second virtual audio source 402-2.

The second virtual audio source 402-2 (i.e., the horn) is displayed using an AR/MR display 204. The AR/MR display 204 can be configured to display the second virtual audio source 402-2 (and any other virtual object) in a "world-centric" view such that the virtual location of the second virtual audio source 402-2 is set in the world independent of the position of pose of the viewer. Accordingly, if viewers turn their heads away from the second virtual audio source 402-2, they will no longer see the virtual object. Other possibilities include, but are not limited to, "body-centric," where the virtual location of a virtual object is set relative to the viewer's body, and "head-centric," where virtual location of a virtual object is set relative to the viewer's head (e.g., a heads-up display).

While the first and second virtual audio sources 402-1, 402-2 do not have actual physical locations, their virtual locations are important in rendering the respective spatialized audio corresponding to the first and second virtual audio source 402-1, 402-2. While the spatialized cinema audio and video experience 400 depicted in FIGS. 12 and 13 include only two virtual audio sources 402-1, 402-2, other spatialized cinema audio experiences may include more or fewer virtual audio sources. For instance, a typical movie scene may include many virtual audio sources, such as background music, background noise, sounds associated with physical actions, and dialogue. Reproducing these many virtual audio sources accurately increases the listener's enjoyment of the spatialized cinema audio experience.

The spatialized cinema audio and video experience 400 has been described with reference to the embodiments of AR/MR and spatialized audio systems herein used to generate and deliver the experience 400. Other video and audio systems may be configured to deliver a spatialized cinema audio and video experience 400, albeit with different levels of accuracy and precision will now be described.

Spatialized Cinema Audio System

Figure 14:
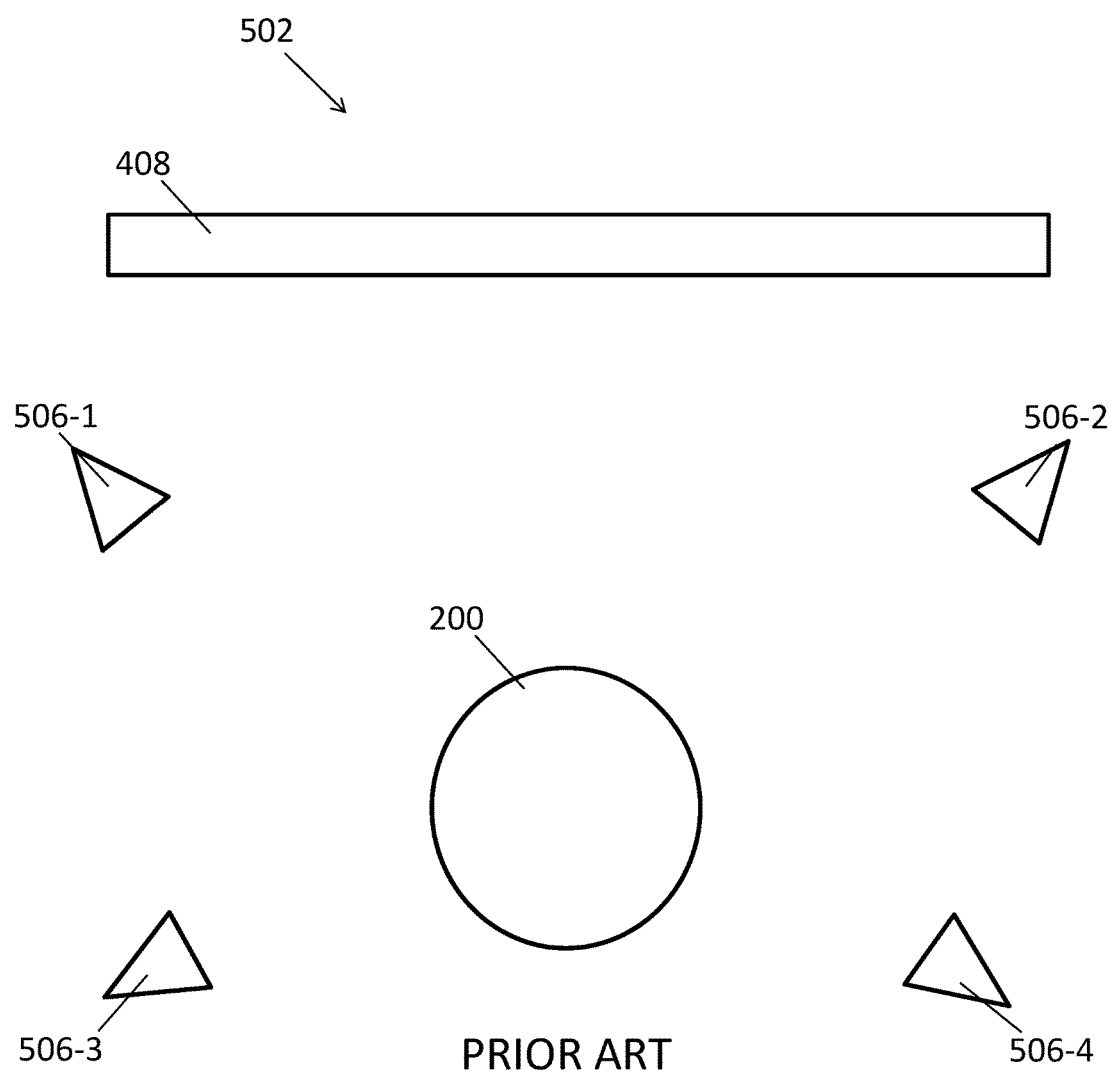
FIG. 14 is a top view of a prior art cinema audio system.

FIG. 14 depicts, from a top view, a conventional spatialized cinema audio system 502, which can be used to generate a spatialized cinema audio experience. The spatialized cinema audio system 502 includes a plurality of cinema speakers 506-1, 506-2, 506-3, 506-4 disposed around a room for a cinema experience (e.g., a movie theater or a home cinema room). The cinema speakers 506-1, 506-2, 506-3, 506-4 can be conventional electrodynamic speakers of various sizes such that each cinema speaker 506 can be optimized to produce sound at specific frequencies (e.g., tweeters, midrange speakers and subwoofers).

While the spatialized cinema audio system 502 depicted in FIG. 14 includes four cinema speakers 506-1, 506-2, 506-3, 506-4, other spatialized cinema audio systems may have fewer or more cinema speakers. For instance, spatialized cinema audio systems in large movie theaters will have a many more cinema speakers. While FIG. 14 depicts the cinema speakers 506-1, 506-2, 506-3, 506-4 as relatively evenly distributed around the listener's head 200, this is only the case for listeners positioned in the center of the audio field generated by the spatialized cinema audio system 502. Especially in large movie theaters, listeners can be positioned significant distances away from the center of the audio field. Such off-center listeners will perceive a distorted audio experience with the amount of distortion proportional to the distance away from the center of the audio field.

In addition, conventional spatialized cinema audio systems do not take into account the head pose of users/listeners who may be augmenting their cinema experience with AR/MR devices. Accordingly, a conventional spatialized cinema audio system will not be able to simultaneously generate/present audio for a plurality of users/listeners who may have different augmented cinema experiences.

Figure 15:
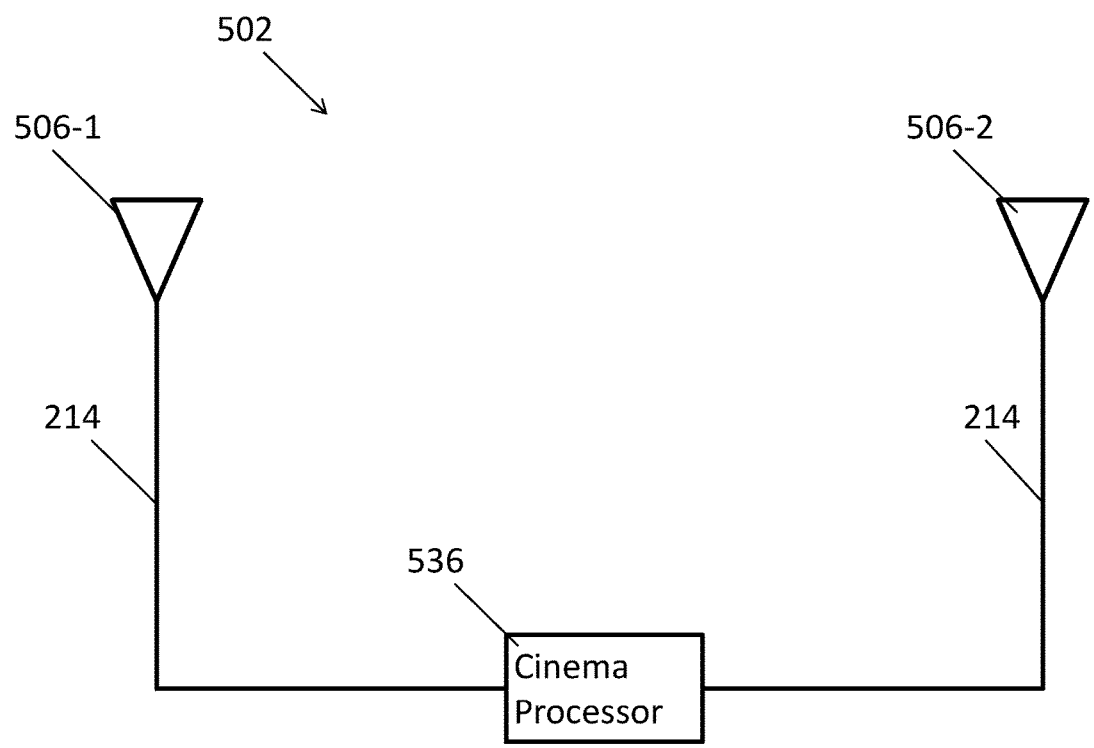
FIG. 15 is a schematic view of a prior art cinema audio system.

FIG. 15 schematically depicts another conventional spatialized cinema audio system 502. The spatialized cinema audio system 502 includes a plurality of cinema speakers 506-1, 506-2 and a cinema audio processor 536. The cinema audio processor 536 is communicatively coupled to the cinema speakers 506-1, 506-2 by fiber optics, wired leads, and/or wireless connectivity 214. The cinema audio processor 536 receives cinema audio source data and generates cinema audio data from the received source data. The cinema audio processor 536 may receive the cinema audio source data from a database maintained by either a movie studio or a media content distributor over a network such as the Internet. The cinema audio processor 536 may receive the cinema audio source data before a movie is played or in real-time while the movie is played. While the spatialized cinema audio system 502 depicted in FIG. 15 includes two cinema speakers 506-1, 506-2, other spatialized cinema audio systems may have fewer or more cinema speakers.

Individualized Spatialized Cinema Audio System

Figure 16:
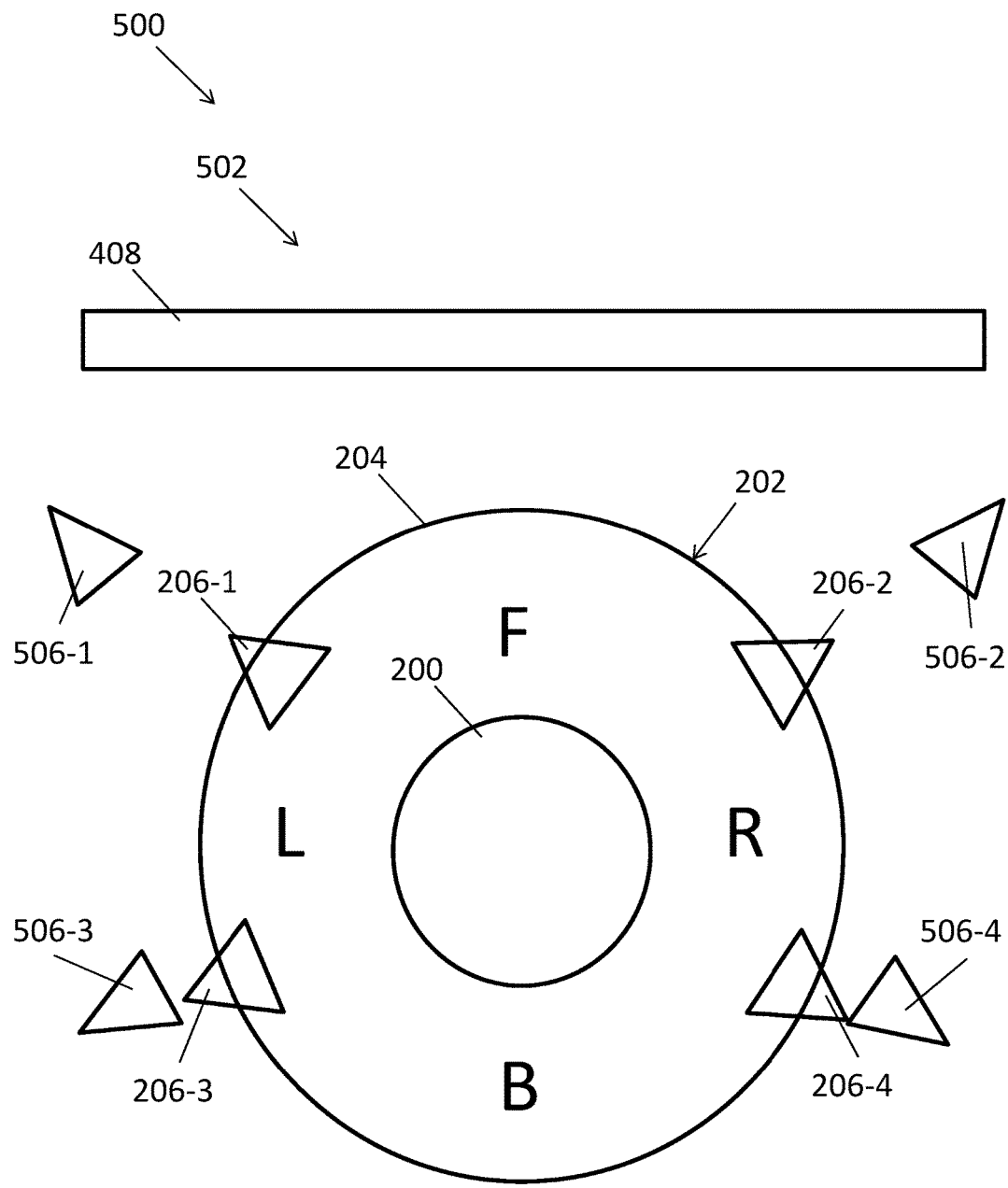
FIGS. 16 and 17 are top views of an individualized cinema audio system according to one embodiment, in FIG. 16, the user is facing forward, while in FIG. 17, the user is facing to the left.

FIG. 16 depicts, from a top view, an individualized spatialized cinema audio system 500 according to one embodiment, which can be used to generate an individualized spatialized cinema audio experience. An individualized spatialized cinema audio experience includes many elements of a conventional spatialized cinema audio experience, such as the one depicted in FIGS. 12 and 13. In addition, the individualized spatialized cinema audio experience layers on top of the conventional spatialized cinema audio experience an individual spatialized audio experience that takes into account the position, orientation and pose of the user/listener.

The individualized spatialized cinema audio system 500 includes a spatialized cinema audio system 502 and a personal spatialized audio system 202. The spatialized cinema audio system 502 includes a plurality of cinema speakers 506-1, 506-2, 506-3, 506-4 disposed around a room for a cinema experience (e.g., a movie theater or a home cinema room). The spatialized cinema audio system 502 has certain aspects in common with the system 502 depicted in FIG. 14 and described above. The differences between these systems will be detailed below.

The personal spatialized audio system 202 is shown in FIG. 16 as being worn on a listener's head 200. The spatialized audio system 202 includes a frame 204 and four personal spatialized audio system speakers 206-1, 206-2, 206-3, 206-4 attached to the frame 204. Spatialized audio system speaker 206-1 is attached to the frame 204 such that, when the spatialized audio system 202 is worn on the listener's head 200, speaker 206-1 is forward F and to the left L of the listener's head 200. Spatialized audio system speaker 206-2 is attached to the frame 204 such that, when the spatialized audio system 202 is worn on the listener's head 200, speaker 206-2 is forward F and to the right R of the listener's head 200. Spatialized audio system speaker 206-3 is attached to the frame 204 such that, when the spatialized audio system 202 is worn on the listener's head 200, speaker 206-3 is behind B and to the left L of the listener's head 200. Spatialized audio system speaker 206-4 is attached to the frame 204 such that, when the spatialized audio system 202 is worn on the listener's head 200, speaker 206-4 is behind B and to the right R of the listener's head 200. All of the spatialized audio system speakers 206-1, 206-2, 206-3, 206-4 are pointed toward the listener's head 200. The personal spatialized audio system speakers 206-1, 206-2, 206-3, 206-4 are also attached to the frame 204 such that, when the personal spatialized audio system 202 is worn on the listener's head 200, the speakers 206-1, 206-2, 206-3, 206-4 are located at respective non-zero distances from the listener's head 200.

The placement of the cinema speakers 506 and personal speakers 206 in the individualized spatialized cinema audio system 500 depicted in FIG. 16 facilitates generation and presentation of individualized spatialized cinema audio. For instance, the cinema speakers 506 may present cinema audio corresponding to a movie soundtrack and background objects and characters that are common to all users/listeners. In addition, the personal speakers 206 may present personal audio corresponding to virtual objects presented only to the particular user/listener wearing the personal spatialized audio system 202 (e.g., an AR/MR system). In this manner, the individualized spatialized cinema audio experience can be customized for each user/listener (e.g., for the location, orientation and head pose thereof).

While the personal speakers 206 may be used to present personal audio corresponding to virtual objects presented only to a particular user/listener, the personal audio from the personal speakers 206 may correspond to objects and characters in a movie that are presented to all users/listeners in a movie theater. In such embodiments, the personal audio from each user/listener's personal speakers 206 may either supplement or replace the cinema audio corresponding to the movie objects and characters. Whether the personal audio supplements or replaces the cinema audio, the individualized spatialized cinema audio system 500 may employ active noise reduction techniques to reduce or cancel out portions of the cinema audio supplemented or replaced by the personal audio. These embodiments may address the issue of accurately producing cinema audio for users/listeners displaced from the center of the cinema audio system audio field.

Figure 17:
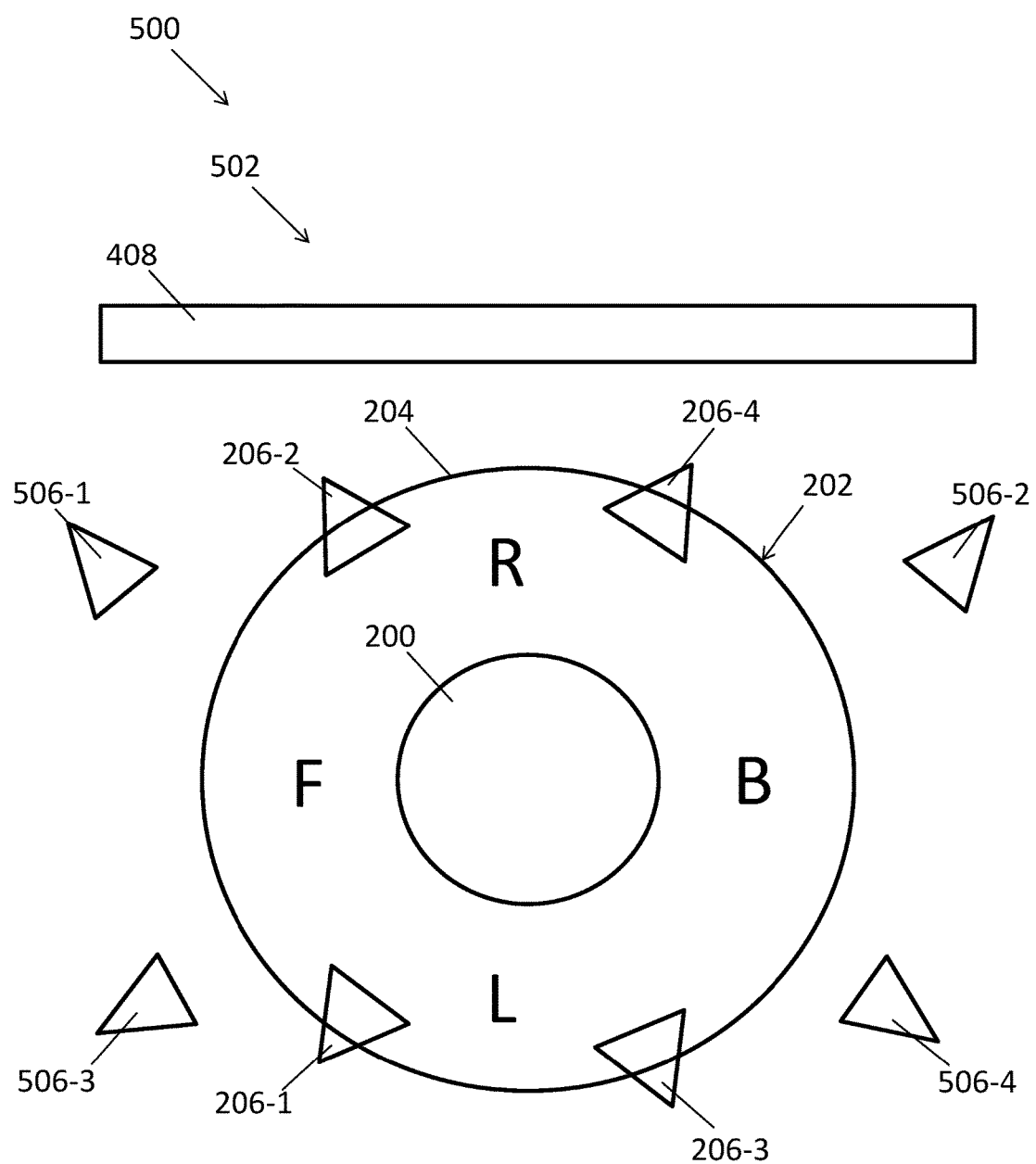

FIG. 17 depicts, from a top view, the individualized spatialized cinema audio system 500 embodiment depicted in FIG. 16. In FIG. 17 however, the user's/listener's head 200 along with the personal spatialized audio system 202 worn thereon have been turned 90° to the left. In this configuration, the frame of reference of the personal spatialized audio system 202 has been rotated 90° left. As such, the right side R of the user's/listener's head 200 is facing the cinema screen/display 408, while the left side L of the user's/listener's head 200 is facing the back of the theater.

As explained above with respect to the spatialized audio system 202 depicted in FIGS. 9 and 11 (and below), the personal spatialized audio system 202 is aware of a head pose of the users/listener and utilizes that head pose to generate and present personal audio consistent with the movie (and/or other media) and the position of the user's/listener's head 200. For instance, a sound in the individualized spatialized cinema audio and video experience 400, such as the one corresponding to the second virtual audio source 402-2 (the horn), should be presented such that the user/listener perceives the audio source as being located to the right and slightly above the listener's head 200 (see FIGS. 12 and 13). In the configuration of the individualized spatialized cinema audio system 500 depicted in FIG. 16, the sound corresponding to the horn may be generated by the personal spatialized audio system speakers 206-2, 206-4 on the right side of the listener's head 200. On the other hand, in the configuration depicted in FIG. 17, the sound corresponding to the horn may be generated by the personal spatialized audio system speakers 206-3, 206-4 on the back side of the listener's head 200. In this manner, the individualized spatialized cinema audio system 500 can more accurately and precisely produce spatialized cinema audio for each user/listener.

While the individualized spatialized cinema audio system 500 depicted in FIGS. 16 and 17 includes four cinema speakers 506-1, 506-2, 506-3, 506-4 and four personal spatialized audio system speakers 206-1, 206-2, 206-3, 206-4, other individualized spatialized cinema audio system 500 may include fewer or more cinema speakers 506 and personal spatialized audio system speakers 206. The number, type, position and orientation of cinema speakers 506 and personal spatialized audio system speakers 206 may be coordinated to optimize presentation of individualized spatialized cinema audio to the users/listeners. For instance, the larger cinema speakers 506 (e.g., subwoofers) may be used to present low frequency sounds while the smaller personal spatialized audio system speakers 206 may be used to present high frequency and middle frequency sounds.

Figure 18:
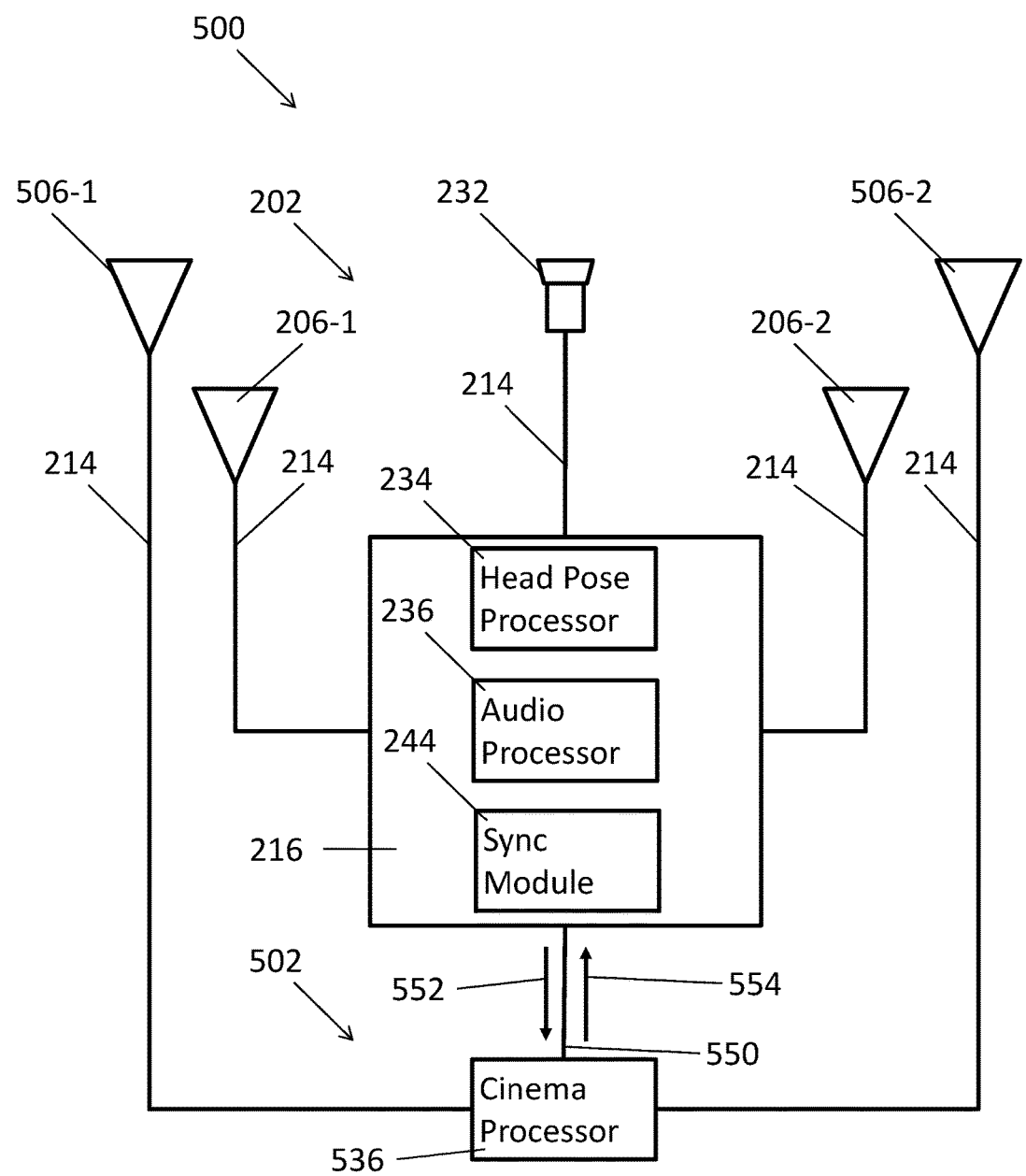
FIGS. 18 to 20 are detailed schematic views of individualized cinema audio systems according to various embodiments.

FIG. 18 schematically depicts an individualized spatialized cinema audio system 500 according to one embodiment. The individualized spatialized cinema audio system 500 includes a cinema audio system 502 and a personal spatialized audio system 202.

The spatialized cinema audio system 502 depicted in FIG. 18 includes a plurality of cinema speakers 506-1, 506-2 and a cinema audio processor 536. The cinema audio processor 536 is communicatively coupled to the cinema speakers 506-1, 506-2 by wired leads and/or wireless connectivity 214. The cinema audio processor 536 receives cinema audio source data and generates cinema audio data from the received source data. The cinema audio processor 536 may receive the cinema audio source data from a database maintained by either a movie studio or a media content distributor over a network such as the Internet. The cinema audio processor 536 may receive the cinema audio source data before a movie is played or in real-time while the movie is played. While the spatialized cinema audio system 502 depicted in FIG. 18 includes two cinema speakers 506-1, 506-2, other spatialized cinema audio systems may have fewer or more cinema speakers.

The personal spatialized audio system 202 depicted in FIG. 18 includes a plurality of spatialized audio system speakers 206-1, 206-2 operatively coupled to a local processing and data module 216 via wired lead and/or wireless connectivity 214. The personal spatialized audio system 202 also includes a head pose sensor 232 operatively coupled to the local processing and data module 216 via wired lead and/or wireless connectivity 214. The head pose sensor 232 is configured to collect head pose data of a listener/user. The head pose sensor 232 may include one or more of image capture devices (such as visible and infrared light cameras), inertial measurement units (including accelerometers and gyroscopes), compasses, microphones, GPS units, or radio devices. While the personal spatialized audio system 202 depicted in FIG. 18 includes only two spatialized audio system speakers 206-1, 206-2, spatialized audio systems according to other embodiments may include more speakers.

The personal spatialized audio system 202 further includes a head pose processor 234 to determine a head pose of a listener/user wearing the personal spatialized audio system 202 based on at least the head pose data collected by the head pose sensor 232. As used in this application, "head pose processor," includes, but is not limited to, one or more separate and independent software and/or hardware components of a computer that must be added to a general purpose computer before the computer can determine a head pose, and computers having such components added thereto.

The personal spatialized audio system 202 further includes a spatialized audio processor 236 to generate spatialized audio data for spatialized audio to be delivered to a listener/user wearing the personal spatialized audio system 202 based on at least the head pose determined by the head pose processor 234. The generated spatialized audio data may include content, position, orientation and volume data for each virtual audio source in a spatialized sound field. As used in this application, "audio processor," includes, but is not limited to, one or more separate and independent software and/or hardware components of a computer that must be added to a general purpose computer before the computer can generate spatialized audio data, and computers having such components added thereto. The spatialized audio processor 234 may also generate audio signals for the plurality of spatialized audio system speakers 206-1, 206-2 based on the spatialized audio data to deliver spatialized audio to the listener/user.

Moreover, the personal spatialized audio system 202 includes a synchronization module 244 to temporarily synchronize the personal audio presented by the personal spatialized audio system 202 to the cinema audio presented by the cinema audio system 502. This temporal synchronization ensures that the personal audio content conforms to the cinema audio content.

The cinema audio system 502 and the personal spatialized audio system 202 in the individualized spatialized cinema audio system 500 depicted in FIG. 18 are operatively and communicatively coupled via personal cinema system link 550. According to certain embodiments, an individualized spatialized cinema audio system 500 includes one way communication from the cinema audio system 502 to the personal spatialized audio system 202. The one way communication allows the personal spatialized audio system 202 to (1) identify the cinema media (e.g., movie) presented by the cinema audio system 502 and (2) synchronize the personal media (e.g., sound specific to a listener/user) to the cinema media. As such, timing information of some type is useful to implement an individualized spatialized cinema audio system 500.

The personal cinema system link 550 in the embodiment shown in FIG. 18 is a two-way communication link. For instance, the cinema audio system 502 and the personal spatialized audio system 202 may be operatively and communicatively coupled by a wireless connection, including but not limited to, Wi-Fi (IEEE 802.11x), Bluetooth, and Near Field Communications. Two-way communication allows the cinema audio system 502 to send media information 552 (e.g., metadata for the media) to the personal spatialized audio system 202, and the personal spatialized audio system 202 to send user/listener information 554 to the cinema audio system 502.

Media information 552 can include media identifying information and/or timing information. Media identifying information can include a title, an EIDR number, and/or other digital object identifier. Timing information can include a time code and/or a cue. An exemplary timecode is a SMPTE time code or MIDI Time code in a UDP packet. The media identifying information allows the personal spatialized audio system 202 receiving the media identifying information to deliver personal audio content to the user/listener that supplements the cinema audio content presented by the cinema audio system 502. The timing information allows the individualized cinema audio system 500 to synchronize the personal spatialized audio system 202 with the cinema audio system 502 such that the personal audio content conforms to the cinema audio content.

User/listener information 554 can include information relating to user/listener reaction to the media. Such reaction information can be manually entered (e.g., via a UI) or automatically collected (e.g., recorded eye movements and/or sounds, such as screams). User/listener information 554 can also include information relating to the user/listener's interaction with an application related to the media. An example of such an application is a game application running on a user/listener's mobile phone based on a movie (i.e., the media). User/listener information 554, such as that from a game app, can help the individualized cinema audio system 500 to personalize the personal audio contents for the particular user/listener, as will be described below.

Figure 19:
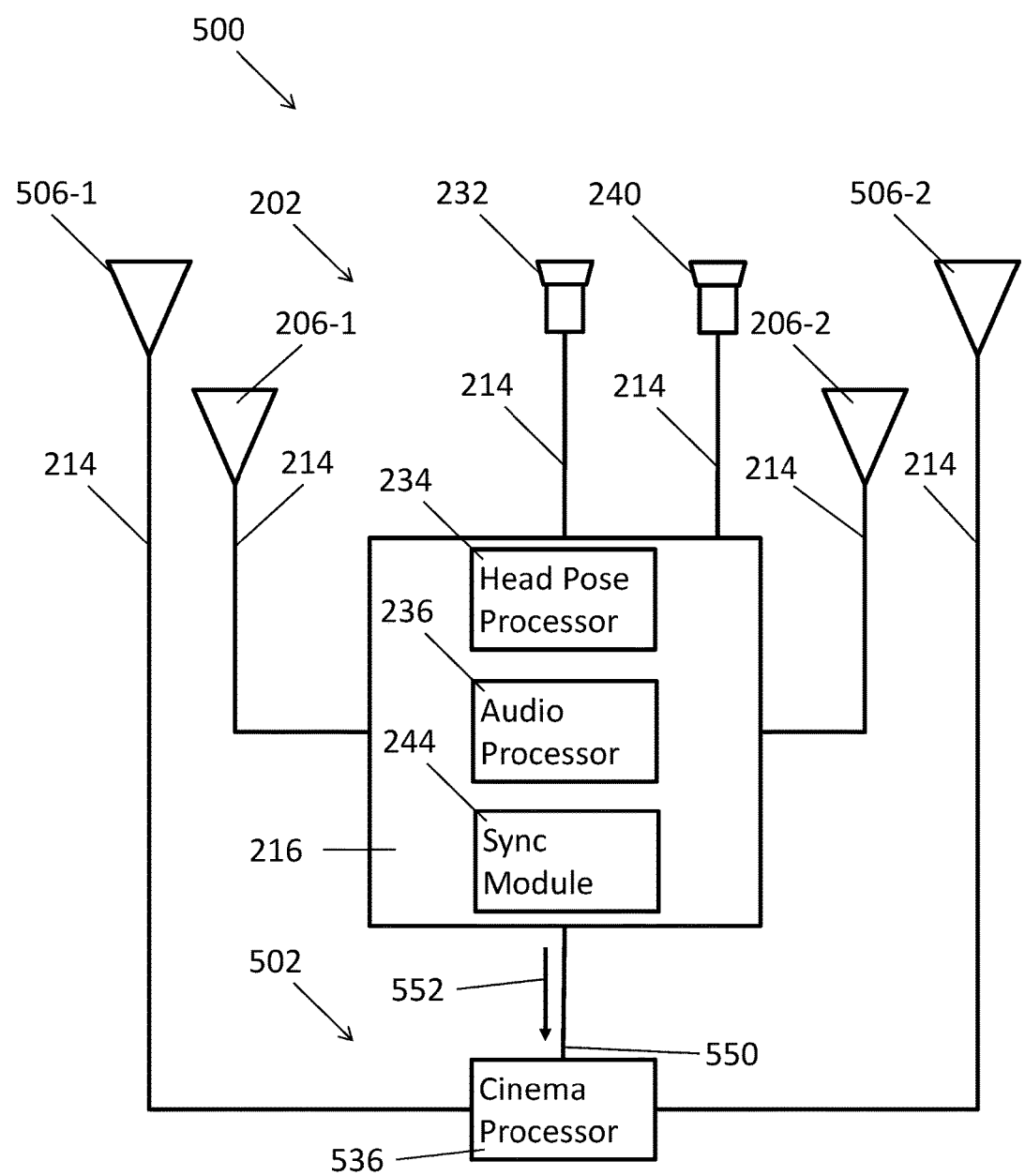
Figure 20:
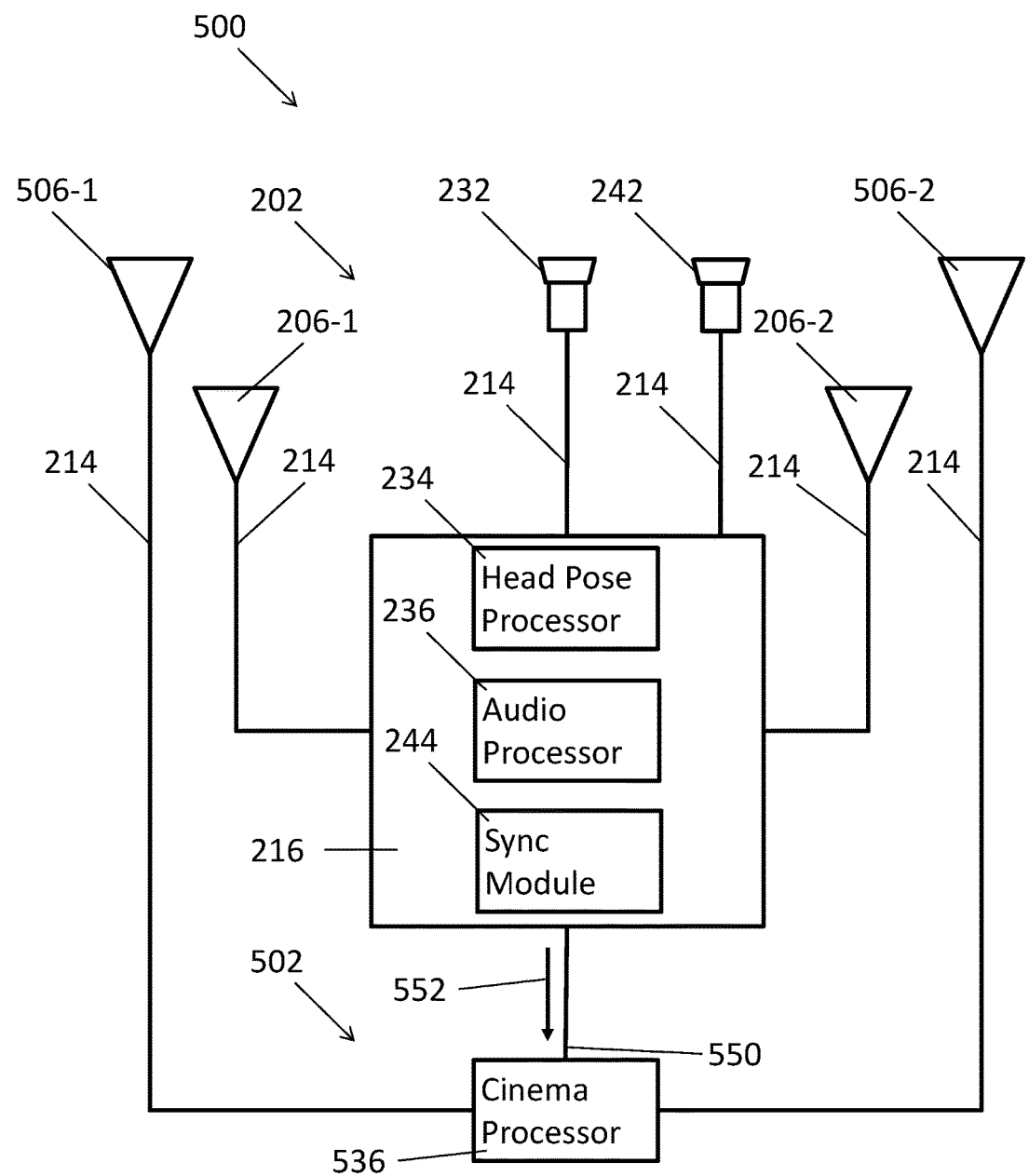

In other embodiments, such as the individualized spatialized cinema audio system 500 depicted in FIGS. 19 and 20, the personal cinema system link 550 is a one-way communication link (from cinema audio system 502 to personal spatialized audio system 202). For instance, the cinema audio system 502 and the personal spatialized audio system 202 may be operatively and communicatively coupled by one or more optical and/or audio cues generated by a cinema system (e.g., the cinema audio system 502) and recognized by the personal spatialized audio system 202.

The audio and/or optical cues may communicate both media identifying information and timing information. Audio cues may include specific audio cues (e.g., sound waves beside the movie soundtrack) or the audio media (e.g., the movie soundtrack) itself. The specific audio cue may be audible or inaudible to humans, as long as the personal audio system 202 can detect and recognize the specific audio cue. The specific audio cue can be audio encoded with media information 552 (e.g., media identifying information and/or timing information). Specific audio cues may be repeated at known intervals to facilitate temporal synchronization of the cinema audio system 502 and the personal spatialized audio system 202.

Synchronization intervals may change depending on system performance. For instance, if the cinema audio system 502 timing and the personal spatialized audio system 202 timing are within a fixed range (e.g., 1 ms), the synchronization interval may be increased. On the other hand, if the timing is diverging, the synchronization interval may be decreased.

Specific audio cues may be sounds that may be played over one or more cinema speakers for a brief time such that they are not recognized by most viewers/users. In such embodiments, the personal audio system 202 includes an audio sensor 240 (e.g., a microphone) to detect the sounds, as shown in FIG. 19. The audio sensor 240 is operatively coupled, such as by a wired lead and/or wireless connectivity 214, to the local processing and data module 216 of the personal spatialized audio system 202. The sounds may be audible or inaudible to the average user, with corresponding audio sensors 240 in the personal audio system 202.

In embodiments where the audio cue includes the audio media itself, the audio media (e.g., a movie soundtrack) may be detected by a cue recognition system as a sample audio data packet made of tonal clusters, which is compared to a plurality of reference audio data packets in a database (e.g., a database of movie soundtrack audio data packets) to identify the media associated with the sample audio data packet. When the sample audio data packet matches a reference audio data packet, the personal audio system 202 identifies a media product (e.g., a movie) associated with the sample audio data packet.

The database of reference audio data packets may include a plurality of identifiers each associated with a respective reference audio data packet. Each identifier may correspond to a respective time in the movie soundtrack and/or a sequence of reference audio data packets following the reference audio data packet associated with the identifier. The individualized cinema audio system 500 may include a reference audio data packet database builder, which is configured to scan the audio media and identify a plurality of reference audio data packets (e.g., tonal clusters) therein. In other embodiments, the reference audio data packet database builder is separate from the individualized cinema audio system 500, which accesses the reference audio data packet database via a network (e.g., the Internet).

In a similar manner, the personal audio system 202 can match a sample audio data packet with a plurality of reference audio data packets in a database to identify a time (e.g., time code) in the identified media product (e.g., movie) associated with the sample audio data packet. When the sample audio data packet matches a reference audio data packet, the personal audio system 202 identifies a time (e.g., time code) in a media product (e.g., a movie). Matching the sample audio data packet to a reference audio data packet to identify a time in a media product can occur simultaneously with identifying the media product or after the media product has been identified. In the latter case, the personal audio system 202 may compare the sample audio data packet with a plurality of reference audio data packets specific to the already identified media product to improve system efficiency. Audio data packets may be sampled and identified repeatedly at known intervals to facilitate temporal synchronization of the cinema audio system 502 and the personal spatialized audio system 202. Repeated audio data packet identification may utilize predicted matching audio data packets and march forward and/or backward therefrom to improve system efficiency.

Like audio cues, optical cues may include specific optical cues (e.g., images beside the movie) or the optical media (e.g., the movie) itself. Optical cues may be presented by a cinema optical system. The specific optical cue may be visible or invisible to humans, as long as the personal audio system 202 can detect and recognize the specific optical cue. The specific optical cue can be one or more images encoded with media information 552 (e.g., media identifying information and/or timing information). Specific optical cues may be repeated at known intervals to facilitate temporal synchronization of the cinema audio system 502 and the personal spatialized audio system 202.

Specific optical cues may be "watermarks" that may be displayed on a screen for a brief time such that it is not recognized by most viewers/users. In such embodiments, the personal audio system 202 includes an optical sensor 242 to detect the watermarks, as shown in FIG. 20. The optical sensor 240 is operatively coupled, such as by a wired lead and/or wireless connectivity 214, to the local processing and data module 216 of the personal spatialized audio system 202. The watermarks may be presented using visible light or invisible (e.g., infrared) light, with corresponding optical sensors 240 in the personal audio system 202.

In embodiments where the optical cue includes the optical media itself, the optical media (e.g., a movie) may be detected by a cue recognition system as a sample optical data packet, which is compared to a plurality of reference optical data packets in a database (e.g., a database of movie image optical data packets) to identify the media associated with the sample optical data packet. When the sample optical data packet matches a reference optical data packet, the personal audio system 202 identifies a media product (e.g., a movie) associated with the sample optical data packet.

In a similar manner, the personal audio system 202 can match a sample optical data packet with a plurality of reference optical data packets in a database to identify a time (e.g., time code) in the identified media product (e.g., movie) associated with the sample optical data packet. When the sample optical data packet matches a reference optical data packet, the personal audio system 202 identifies a time (e.g., time code) in a media product (e.g., a movie). Matching the sample optical data packet to a reference optical data packet to identify a time in a media product can occur simultaneously with identifying the media product or after the media product has been identified. In the latter case, the personal audio system 202 may compare the sample optical data packet with a plurality of reference optical data packets specific to the already identified media product to improve system efficiency. Optical data packets may be sampled and identified repeatedly at known intervals to facilitate temporal synchronization of the cinema optical system 502 and the personal spatialized optical system 202. Repeated optical data packet identification may utilize predicted matching optical data packets and march forward and/or backward therefrom to improve system efficiency.

Whether the personal cinema system link 550 is a two-way or one-way communication link, the cinema audio system 502 can send media information 552 (e.g., media identifying information and timing information) to the personal spatialized audio system 202 over the personal cinema system link 550, as shown in FIGS. 19 and 20.

Having described various aspects of personalized spatialized audio systems 202 and individualized cinema audio systems 500 according to various embodiments, methods for presenting personalized spatialized audio and individualized cinema audio using spatialized audio systems (e.g., 202) and individualized cinema audio systems (e.g., 500) will now be described.

Figure 21:
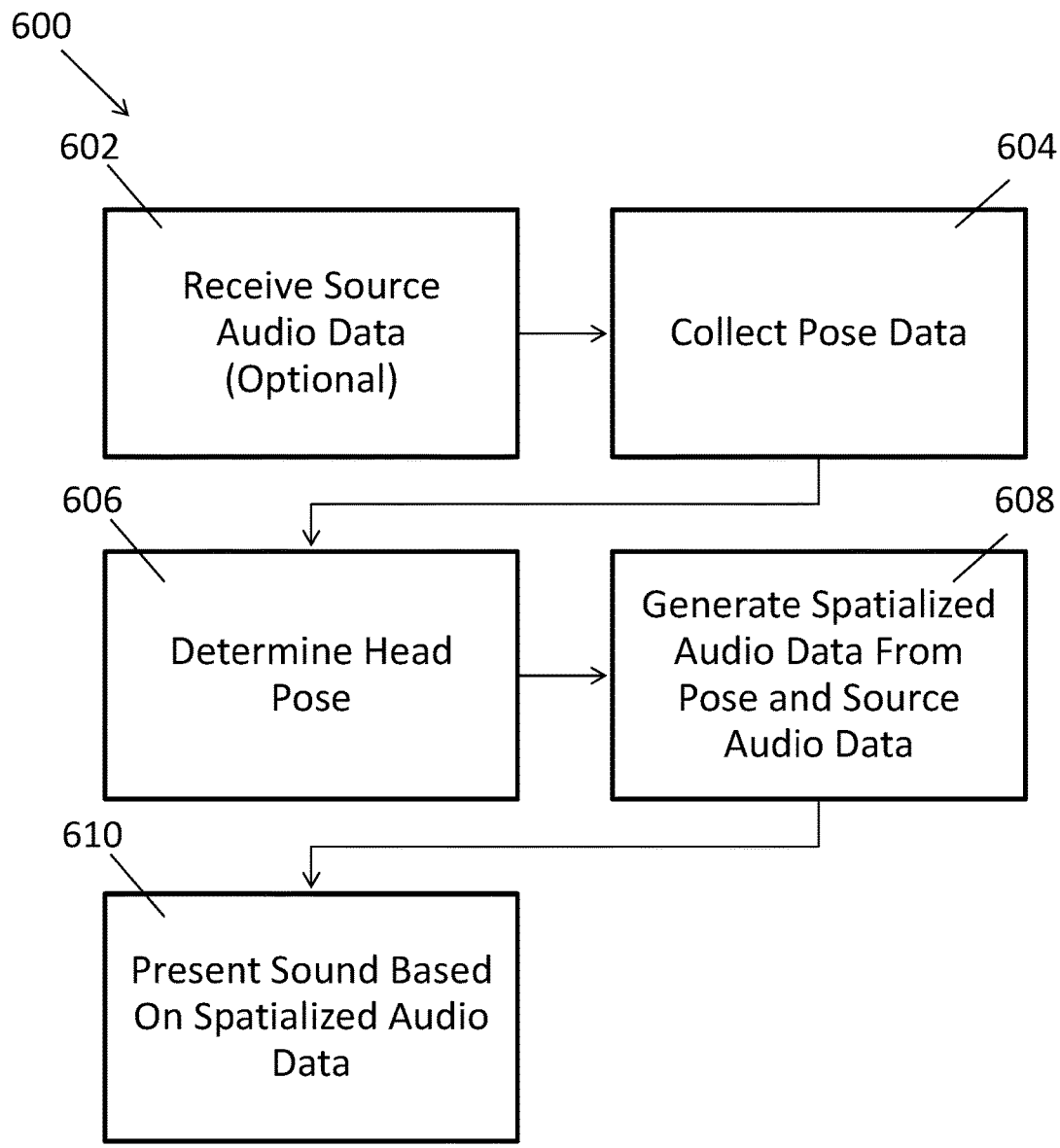
FIG. 21 is a flowchart depicting a method of presenting spatialized audio utilizing a personalized spatialized audio system according to one embodiment.

FIG. 21 depicts a method 600 of presenting spatialized audio utilizing a personalized spatialized audio system according to one embodiment. The personalized spatialized audio system 202 may include a head pose sensor 232, a head pose processor 234, a spatialized audio processor 236 and personal spatialized audio systems speakers 206, as shown in FIGS. 9, 11 and 18-20, for example.

At step 602, the personalized spatialized audio system 202 optionally receives source audio data. The source audio data corresponds to sound intended to be delivered to the user/listener via the speakers 206 of the personalized spatialized audio system 202. The source audio data may be received from a database via a wired or wireless connection. Alternatively, the source audio data may be previously received and stored on the personalized spatialized audio system 202. The personalized spatialized audio system 202 modifies the source audio data such that the sound presented by the speakers 206 conforms to the head pose of the user/listener. The relative coordinates (including angular coordinates) between the user's head (modified by a current head pose) and the virtual sound source can be used to select a corresponding Head Related Transfer Function (HRTF) that can be used to process mono channel audio to provide left and right side spatialized audio channels that are output through speakers 206.

At step 604, the personalized spatialized audio system 202 collects pose data (e.g., head pose data through the head pose sensor 232). The head pose sensor 232 may include one or more of image capture devices (such as visible and infrared light cameras), inertial measurement units (including accelerometers and gyroscopes), compasses, microphones, GPS units, and radio devices. The head pose sensor 232 may collect head pose data in the form of one or more of images, acceleration and gyroscopic information, compass information, sounds, GPS information, and radio transmissions. All of this data may be used to determine a head pose of a user/listener.

At step 606, the personalized spatialized audio system 202 (e.g., the head pose processor 234) determines a pose (e.g., head pose) of the user/listener currently wearing the personalized spatialized audio system 202. The calculations performed by the head pose processor 234 vary depending on the type(s) of pose data collected (e.g., through the head pose sensor 232).

At step 608, the personalized spatialized audio system 202 (e.g., the audio processor 236) generates spatialized audio data from the source audio data and the determined pose of the user/listener. For instance, the user/listener's head is turned to the left as shown in FIG. 17, the personalized spatialized audio system 202 will generate spatialized audio data such that sounds virtually emanating from a virtual object to the left of the user/listener appears to originate from the front of the user/listener's head. Spatialized audio data can also be generated to take into account the pitch and roll of the user/listener's head in addition to the yaw. Further, spatialized audio data can be generated to take into account the virtual distance of virtual sound sources from the user/listener's head.

At step 610, the personalized spatialized audio system 202 (e.g., the speakers 206) presents sound based on the spatialized audio data. The configurations of the speakers 206, such as those shown in FIGS. 2 to 8 facilitate presentation of sound (e.g., spatialized audio) that is variable along three axes (e.g., X, Y, and Z axes).

Figure 22:
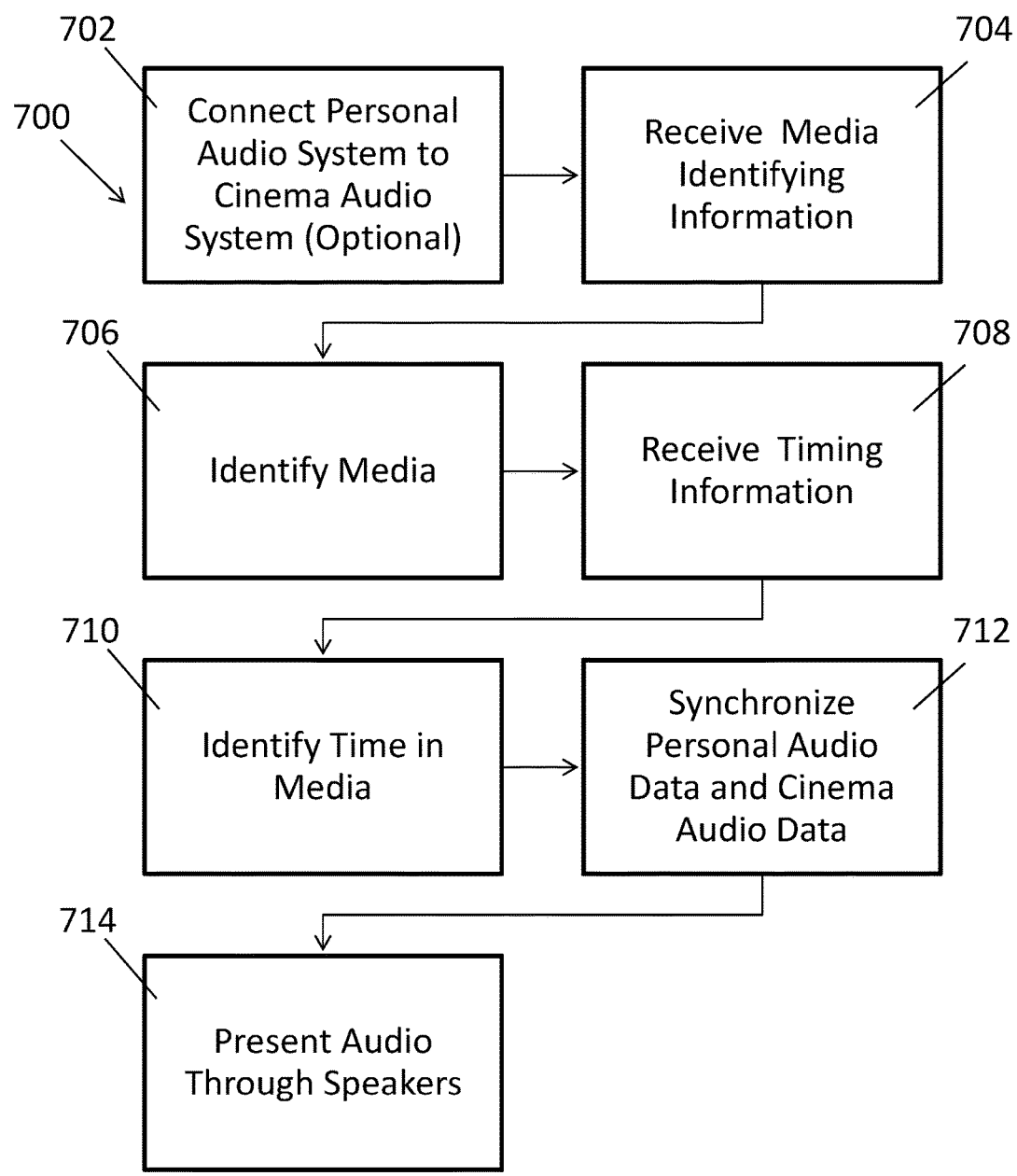
FIGS. 22 and 23 are flowcharts depicting methods of synchronizing components of an individualized cinema audio, and presenting individualized cinema audio utilizing an individualized cinema audio system according to two embodiment.

FIG. 22 depicts a method 700 of synchronizing components of an individualized cinema audio, and presenting individualized cinema audio utilizing an individualized cinema audio system according to one embodiment. The individualized cinema audio system 500 may include a personalized spatialized audio system 202 and a cinema audio system 502, as shown in FIGS. 18-20, for example. The personalized spatialized audio system 202 includes a head pose sensor 232, a head pose processor 234, a spatialized audio processor 236, a synchronization module 244 and personal spatialized audio systems speakers 206. The cinema audio system 502 includes a cinema processor 536 and cinema speakers 506. The personalized spatialized audio system 202 and the cinema audio system 502 are operatively coupled by a personal cinema system link 550, which can be a two-way link (FIG. 18) or a one-way link (FIGS. 19 and 20).

At step 702, the personalized spatialized audio system 202 and the cinema audio system 502 are optionally connected. This step typically occurs with two-way links 550, such as a wireless connection, including but not limited to, Wi-Fi (IEEE 802.11x), Bluetooth, and Near Field Communications. In embodiments with two-way links 550, the personalized spatialized audio system 202 and the cinema audio system 502 may be connected using a handshake protocol that may involve authentication (e.g., Wi-Fi password). The synchronization module 244 can contribute to this connection.

At step 704, the individualized cinema audio system 500 (i.e., the synchronization module 244 of the personalized spatialized audio system 202) receives media identifying information from the cinema audio system 502. Media identifying information can include a title, an EIDR number, and/or other digital object identifier. The media identifying information allows the personal spatialized audio system 202 receiving the media identifying information to deliver personal audio content to the user/listener that supplements the cinema audio content presented by the cinema audio system 502. The media identifying information may be communicated from the cinema audio system 502 to the personal spatialized audio system 202 (e.g., over a two-way link 550).

In embodiments where the personalized spatialized audio system 202 and the cinema audio system 502 are not connected, the media identifying information may also be communicated using audio cues, such as, specific audio cues (e.g., sound waves beside the movie soundtrack) or the audio media (e.g., the movie soundtrack) itself. Further, the media identifying information may also be communicated using optical cues, such as specific optical cues (e.g., images beside the movie) or the optical media (e.g., the movie) itself.

At step 706, the individualized cinema audio system 500 (i.e., the synchronization module 244 of the personalized spatialized audio system 202) identifies the media by analyzing the received media identifying information. In order to identify the media, the spatialized audio processor 236 may simply read a title, an EIDR number, and/or other digital object identifier. Alternatively, the spatialized audio processor 236 may compare the media identifying information to a known set of data (e.g., specific audio/optical cues). In embodiments where the cue includes the media itself, the media (e.g., a movie soundtrack or a movie) may be detected by a cue recognition system as a sample data packet, which is compared to a plurality of reference data packets in a database (e.g., a database of movie soundtrack audio data packets or a database of movie image optical data packets) to identify the media associated with the sample data packet. When the sample data packet matches a reference data packet, the personal audio system 202 identifies a media product (e.g., a movie) associated with the sample data packet.

At step 708, the individualized cinema audio system 500 (i.e., the synchronization module 244 of the personalized spatialized audio system 202) receives timing information from the cinema audio system 502. Timing information can include a time code and/or a cue. The timing information allows the individualized cinema audio system 500 to synchronize the personal spatialized audio system 202 with the cinema audio system 502 such that the personal audio content conforms to the cinema audio content. The timing information may be communicated from the cinema audio system 502 to the personal spatialized audio system 202 (e.g., over a two-way link 550).

In embodiments where the personalized spatialized audio system 202 and the cinema audio system 502 are not connected, the timing information may also be communicated using audio cues, such as, specific audio cues (e.g., sound waves beside the movie soundtrack) or the audio media (e.g., the movie soundtrack) itself. Further, the timing information may also be communicated using optical cues, such as specific optical cues (e.g., images beside the movie) or the optical media (e.g., the movie) itself.

At step 710, the individualized cinema audio system 500 (i.e., the synchronization module 244 of the personalized spatialized audio system 202) identifies a time in media by analyzing the received timing information. In order to identify the time, the spatialized audio processor 236 may simply read a time code. Alternatively, the spatialized audio processor 236 may compare the timing information to a known set of data (e.g., specific audio/optical cues). In embodiments where the cue includes the media itself, the media (e.g., a movie soundtrack or a movie) may be detected by a cue recognition system as a sample data packet, which is compared to a plurality of reference data packets in a database (e.g., a database of movie soundtrack audio data packets or a database of movie image optical data packets) to identify the media associated with the sample data packet. When the sample data packet matches a reference data packet, the personal audio system 202 identifies a media product (e.g., a movie) associated with the sample data packet. The personal audio system 202 may compare the sample data packet with a plurality of reference data packets specific to the already identified media to improve system efficiency.

At step 712, the individualized cinema audio system 500 (i.e., the synchronization module 244 of the personalized spatialized audio system 202) synchronizes the personalized audio data and the cinema audio data (i.e., the personalized spatialized audio system 202 and the cinema audio system 502) using the identified time in the media and the known time the personalized audio. Synchronizing the personalized audio data and the cinema audio data ensures that the personal audio content conforms to the cinema audio content. For instance, if the personal audio content is an orchestra playing a symphony and the cinema audio content is the bass portion of the symphony, synchronizing the personalized audio data and the cinema audio data ensures that the bass portion delivered through the larger speakers 506 of the cinema audio system 502 to the rest of the symphony delivered through the smaller speakers 206 of the personal spatialized audio system 202.

At step 714, the individualized cinema audio system 500 (e.g., the spatialized audio system speakers 206 of the spatialized audio system 202 and the cinema speakers 206 of the cinema audio system 502) present audio/sound (e.g., personalized audio and cinema audio) corresponding to the synchronized personal audio data and cinema audio data. The individualized cinema audio system 500 can render the personal audio data and cinema audio data as audio/sound through a digital to analog converter and an amplifier.

Although not shown in FIG. 22, time codes and/or data packets may be sampled and identified repeatedly at known intervals to facilitate temporal synchronization of the cinema audio data and the personal spatialized audio data. Repeated data packet identification may utilize predicted matching data packets and march forward and/or backward therefrom to improve system efficiency.

Figure 23:
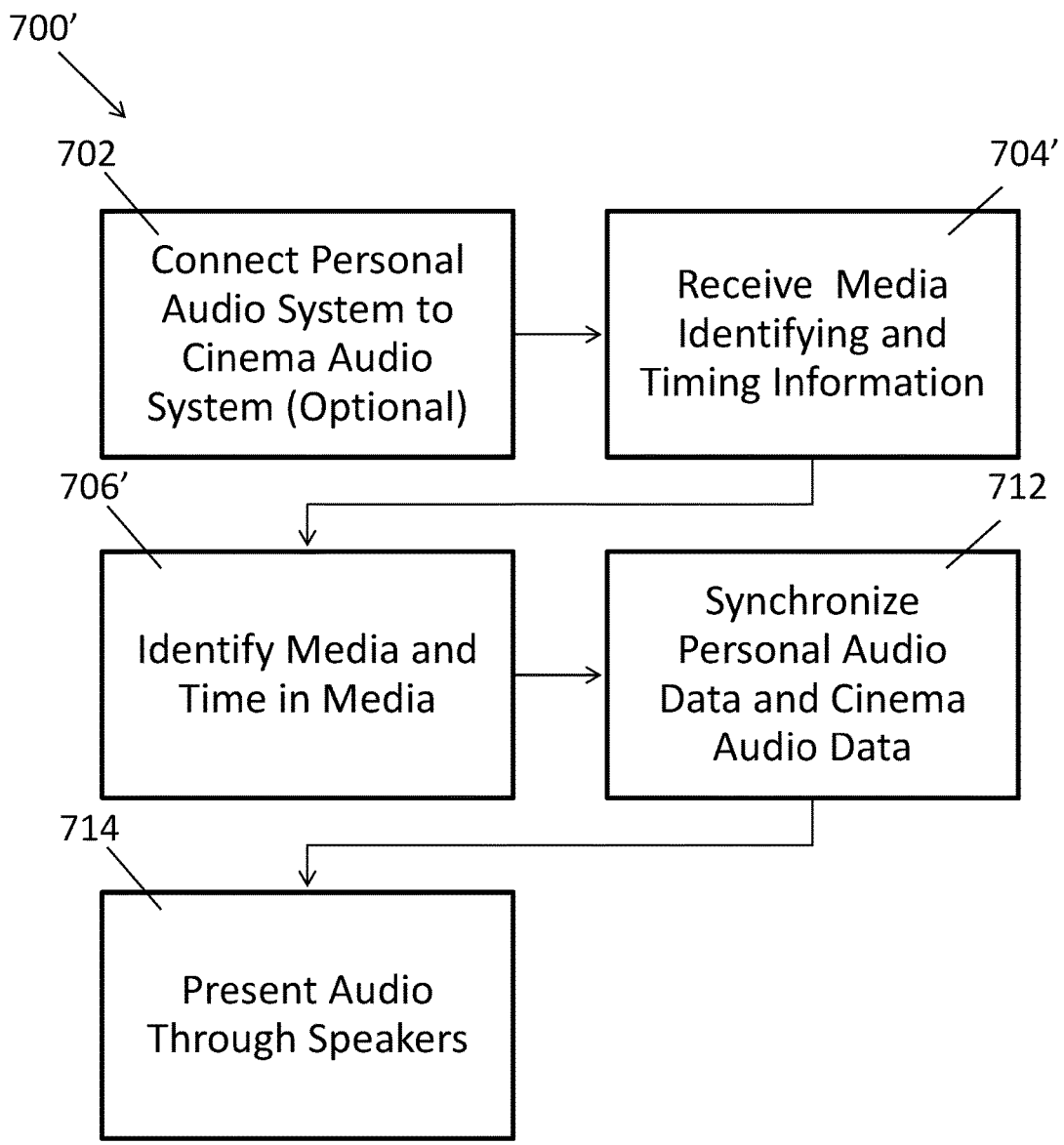

Matching the sample data packet to a reference data packet to identify a time in a media product can occur after the media product has been identified (FIG. 22) or simultaneously with identifying the media product. For instance, FIG. 23 depicts a method 700' of presenting individualized cinema audio utilizing an individualized cinema audio system according to another embodiment. Steps 702, 712 and 714 in the method 700' depicted in FIG. 23 are identical to the corresponding steps in the method 700 depicted in FIG. 22.

One difference between the methods 700, 700' is that steps 704 and 708 from method 700 are collapsed into new step 704' in method 700'. In step 704', the individualized cinema audio system 500 (i.e., the synchronization module 244 of the personalized spatialized audio system 202) receives media identifying information and timing information from the cinema audio system 502. Details regarding reception of the media identifying information and timing information are similar to those described above for steps 704 and 708 from method 700. One difference is that both identifying information and timing information may be transmitted using the same cue.

Another difference between the methods 700, 700' is that steps 706 and 710 from method 700 are collapsed into new step 706' in method 700'. In step 706', the individualized cinema audio system 500 (i.e., the synchronization module 244 of the personalized spatialized audio system 202) identifies the media and a time in the media by analyzing the received media identifying information and timing information. Details regarding identification of the media and the time in the media are similar to those described above for steps 706 and 710 from method 700. One difference is that, for embodiments in which a cue includes the media itself, the media (e.g., a movie soundtrack or a movie) may be detected by a cue recognition system as a sample data packet, which is compared to a plurality of reference data packets in a database (e.g., a database of movie soundtrack audio data packets or a database of movie image optical data packets) to identify the media associated with the sample data packet and a time therein.

Figure 24:
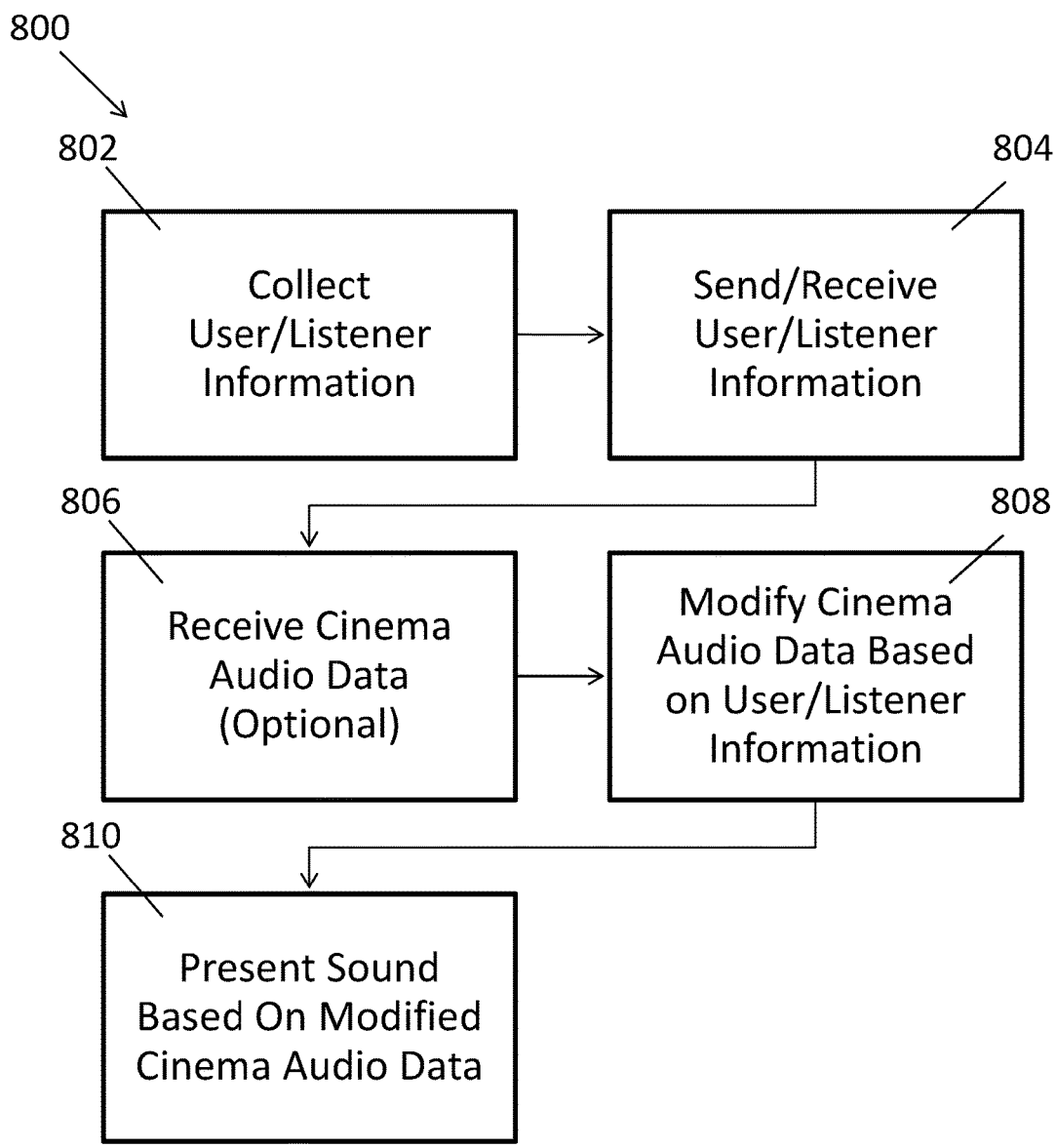
FIG. 24 is a flowchart depicting a method of presenting modified cinema audio utilizing an individualized cinema audio system according to one embodiment.

FIG. 24 depicts a method 800 of presenting modified cinema audio utilizing an individualized cinema audio system according to one embodiment. The individualized cinema audio system 500 may include a personalized spatialized audio system 202 and a cinema audio system 502, as shown in FIG. 18, for example. The personalized spatialized audio system 202 includes a head pose sensor 232, a head pose processor 234, a spatialized audio processor 236, a synchronization module 244 and personal spatialized audio systems speakers 206. The cinema audio system 502 includes a cinema processor 536 and cinema speakers 506. The personalized spatialized audio system 202 and the cinema audio system 502 are operatively coupled by a two-way personal cinema system link 550.

At step 802, the individualized cinema audio system 500 (i.e., the personalized spatialized audio system 202) collects user/listener information. User/listener information 554 can include information relating to user/listener reaction to media. Such reaction information can be manually entered (e.g., via a UI) or automatically collected (e.g., recorded eye movements and/or sounds, such as screams). The user/listener information 554 can be collected by various sensors operatively coupled to the personalized spatialized audio system 202.

At step 804, the personalized spatialized audio system 202 sends the user/listener information to the cinema audio system 502. In turn, the cinema audio system 502 receives the user/listener information from the personalized spatialized audio system 202. This transmission of user/listener information can occur via a two-way personal cinema system link 550.

At step 806, the individualized cinema audio system 500 (i.e., the cinema audio system 502) optionally receives cinema audio data. The cinema audio data can be received from a database on a host computer operated by a movie distributor. In such an embodiment, the cinema audio system 502 optionally receives the cinema audio data from the host computer via a network (e.g., the Internet).

At step 808, the individualized cinema audio system 500 (i.e., the cinema audio system 502) modifies the cinema audio data based on the user/listener information. For instance, in an embodiment where the user/listener information includes screams from many audience members wearing respective personalized spatialized audio systems 202, the cinema audio system 502 may modify the cinema audio data to add the screams from the audience members. This modification personalizes the movie soundtrack for the audience.

At step 810, the cinema audio system 502 (e.g., the cinema speakers 506) presents sound based on the modified cinema audio data. The cinema speakers 506 can be configured to facilitate presentation of sound (e.g., spatialized audio) that is variable along three axes (e.g., X, Y, and Z axes).

In some embodiments, user/listener information 554 can include information relating to the user/listener's interaction with an application related to the media. An example of such an application is a game application running on a user/listener's mobile phone based on a movie (i.e., the media). User/listener information 554, such as that from a game app, can help the individualized cinema audio system 500 to personalize the personal audio contents for the particular user/listener. For example, a character/avatar presented to user/listener as part of the media can be varied depending on a user/listener's level in a game app based on the media. The character/avatar can be presented via a personalized spatialized audio system 202 connected to an AR/MR display system.

Figure 25:
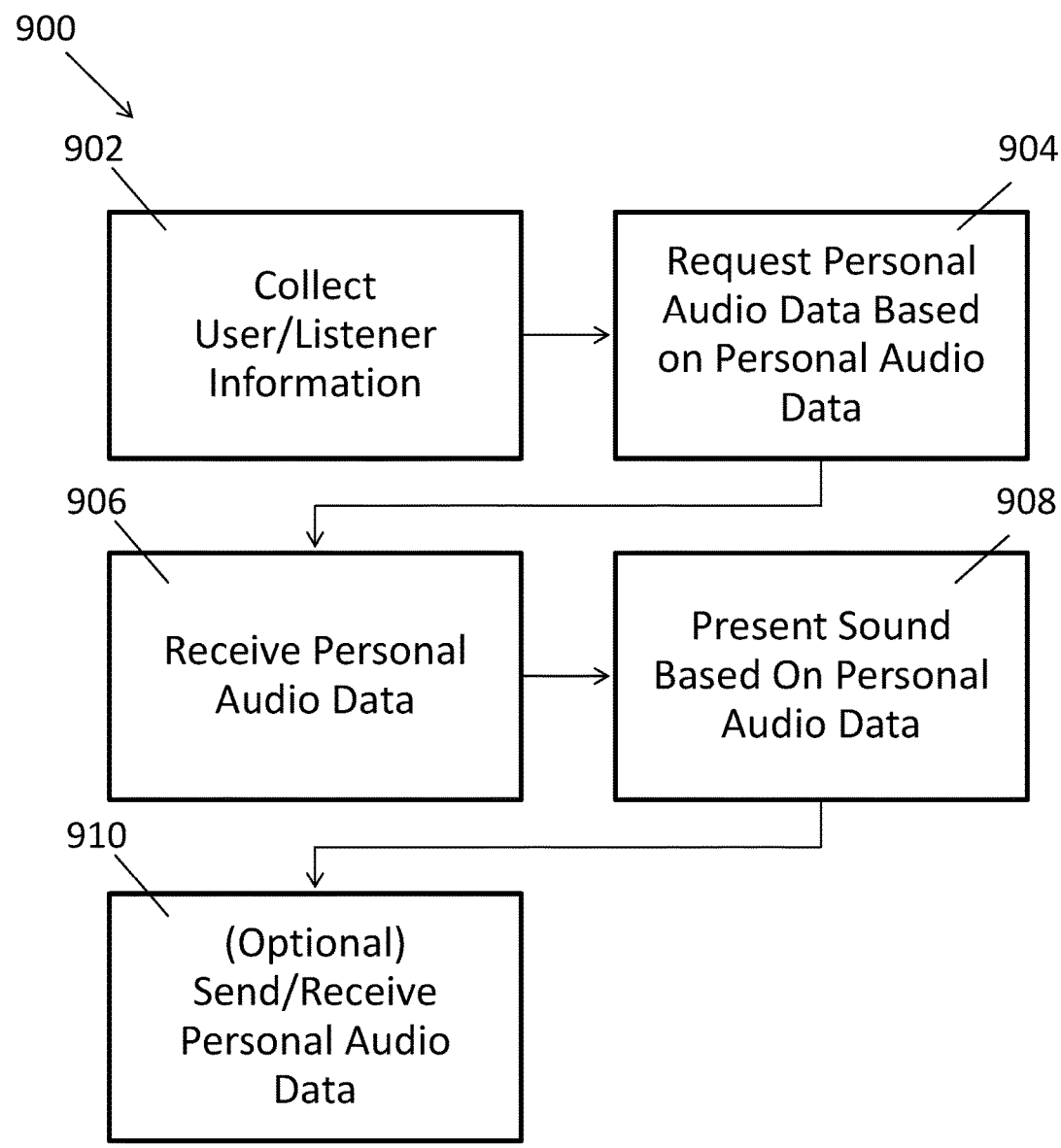
FIG. 25 is a flowchart depicting a method of selectively presenting personal audio utilizing an individualized cinema audio system according to one embodiment.

For example, FIG. 25 depicts a method 900 of selectively presenting personal audio utilizing an individualized cinema audio system according to one embodiment. The individualized cinema audio system 500 may include a personalized spatialized audio system 202 and a cinema audio system 502, as shown in FIG. 18, for example. The personalized spatialized audio system 202 includes a head pose sensor 232, a head pose processor 234, a spatialized audio processor 236, a synchronization module 244 and personal spatialized audio systems speakers 206. The cinema audio system 502 includes a cinema processor 536 and cinema speakers 506. The personalized spatialized audio system 202 and the cinema audio system 502 are operatively coupled by a two-way personal cinema system link 550.

At step 902, the individualized cinema audio system 500 (i.e., the personalized spatialized audio system 202) collects user/listener information. User/listener information 554 can include can include information relating to the user/listener's interaction with an application related to the media. As described above, user/listener information 554 may include a user's level or progress in a game app related to a movie. In embodiments with the game app is running on the user/listener's phone, the personalized spatialized audio system 202 can collect the user/listener information 554 via a wireless link (e.g., Wi-Fi, Bluetooth, NFC, etc.) To the user/listener's phone.

At step 904, the individualized cinema audio system 500 (i.e., the personalized spatialized audio system 202) selectively requests personal audio data, based on the received user/listener information. For instance, the requested personal audio data may correspond to the user/listener's level in the game app. The request for personal audio data may be accompanied by a request for personal AR/MR data that also corresponds to the user/listener's level in the game. The personal audio data can be requested from a database on a host computer operated by a movie theater or a movie distributor. In such an embodiment, the personalized spatialized audio system 202 sends the request to the host computer via a network (e.g., a WLAN network and/or the Internet).

At step 906, the individualized cinema audio system 500 (i.e., the personalized spatialized audio system 202) receives the requested personal audio data. The personal audio data can be received from a database on a host computer operated by a movie theater or a movie distributor. In such an embodiment, the personalized spatialized audio system 202 receives the personal audio data from the host computer via a network (e.g., the Internet).

At step 908, the personalized spatialized audio system 202 (e.g., the personal spatialized audio system speakers 206) presents sound based on the requested personal audio data. The configurations of the speakers 206, such as those shown in FIGS. 2 to 8 facilitate presentation of sound (e.g., spatialized audio) that is variable along three axes (e.g., X, Y, and Z axes).

At step 910, the personalized spatialized audio system 202 optionally sends the requested personal audio data to the cinema audio system 502, which in turn receives the requested personal audio data. Transmission of the requested personal audio data to the cinema audio system 502 allows the cinema audio system to modify the cinema audio to conform to the personal audio if appropriate.

Individualized Spatialized Cinema Experience

One exemplary individualized spatialized cinema experience involves multiple users wearing AR/MR display and spatialized audio systems attending a cinema. Each of the AR/MR display and spatialized audio systems are synchronized to the cinema video and audio processors to provide an individualized spatialized cinema experience for each user. For instance, the AR/MR display and spatialized audio systems may be synchronized with the cinema video and audio processors using any of the techniques described above. Accordingly, the AR/MR display in spatialized audio system has access to media identifying and timing information corresponding to the media being displayed using the cinema video and audio processors. As discussed above, the timing information can be required at appropriate intervals to maintain temporal synchronization.

For instance, the media (e.g., movie) can depict a robot on the cinema screen moving toward the users. Before the robot reaches the edge of the cinema screen, the cinema video and audio systems can present all of the images and audio with the AR/MR display and spatialized audio systems not actively generating images or audio. Because the AR/MR display and spatialized audio systems are non-occluding, of the user's ears and eyes, the users can view and hear the media generated by the cinema systems. When the robot reaches the edge of the cinema screen, the AR/MR display and spatialized audio systems in the audience begin generating AR/MR images and spatialized audio. At the same time, a portion of the cinema display can be modified to conform to the AR/MR images. For instance, certain pixels of the cinema display can be blanked out.

The robot can "walk off of the screen" and come within an arm's length of each user. Because the robot is now being presented by each user's AR/MR display and spatialized audio system, each user will see and hear an individualized robot rendered by the light field and sound field generated by their AR/MR display in spatialized audio system. Because the robot is now individualized for each user, users may not see or hear the robot interacting with the user sitting next to them. Alternatively, each user may see and hear a plurality of robots interacting with their neighbors.

While this has been described as an individualized spatialized cinema experience, the systems and methods described herein apply equally to other experiences, such as gaming and mixed media experiences. Individualizing such experiences, including the addition of spatialized audio, greatly increases user enjoyment.

While various system components are described in various configurations in the personalized spatialized audio systems and individualized cinema audio systems described above, the system configurations are intended to be illustrative and not limiting. For instance, in embodiments that are not depicted, a specific system components may be disposed in a different part of the system. Moreover, functions attributed to multiple system components may be performed by a single system component. Further, multiple functions attributed to a single system component may be performed by multiple system components.

While various steps are described in various methods (e.g., of generating spatialized audio, linking personal audio systems to cinema audio systems, and generating individualized cinema audio) in specific orders, the steps described herein may be performed in any order as long as the desired results are achieved.

The personal audio data (e.g., the media, the media identifying information, and the timing information) may be streamed to the personal audio systems in some embodiments. In other embodiments, the personal audio data may be preloaded on the personal audio systems before the personal audio data is needed to generate an individualized cinema audio experience. In still other embodiments, the personal audio data may be streamed into a working buffer of the personal audio system which holds a certain number of minutes of audio data. Then as the movie plays, the system can stream personal audio data into the working buffer. Such a system would minimize memory required, minimize pre-loading time, and provide function in the event of network disruptions.

In some embodiments the cinema processor may convey metadata about the current movie scene (e.g. geometry and material data) which can be sent to the spatialized audio processor in the personal audio system to improve acoustic modeling relating to the current movie scene.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A spatialized audio system, comprising:
a frame to be worn on a head of a user;
a plurality of speakers attached to the frame such that, when the frame is worn by the user, each of the plurality of speakers are disposed at a respective non-zero distance from the user's head, such that each of the plurality of speakers does not contact any surface of the user's head, including the user's ears;
a head pose sensor to collect head pose data of the user;
a head pose processor to determine a head pose of the user from the head pose data; and
a spatialized audio processor to generate spatialized audio data based on the determined head pose of the user,
wherein the speakers generate first sounds corresponding to the generated spatialized audio data,
wherein the spatialized audio processor receives first timing information at a first time to synchronize the first sounds with second sounds at the first time,
wherein the first timing information comprises an optical cue in a video corresponding to the generated second sounds or an optical cue projected separately from a video corresponding to the generated second sounds.

2. The system of claim 1, further comprising:
a cinema audio processor operatively coupled to the spatialized audio processor, wherein the cinema audio processor generates cinema audio data; and
a plurality of cinema speakers to generate the second sounds corresponding to the generated cinema audio data,
wherein the spatialized audio processor receives the first timing information from the cinema audio processor.

3. The system of claim 2, wherein the cinema audio processor transmits cinema information to the spatialized audio processor.

4. The system of claim 3, wherein the cinema information comprises one of timing information, virtual object sound information, position information, orientation information, a hyperlink, or acoustic modeling information.

5. The system of claim 2, wherein the spatialized audio processor compensates for a latency difference between the spatialized audio processor and the cinema audio processor.

6. The system of claim 2, further comprising a user sensor to collect user information for transmission to the cinema audio processor.

7. The system of claim 6, wherein the user information includes a sampled sound from the user, and wherein the modified cinema audio data incorporates sampled sound.

8. The system of claim 6, wherein the cinema audio processor modifies the cinema audio data based on the user information such that the second sounds correspond to the modified cinema audio data.

9. The system of claim 8, wherein the cinema audio data is organized in a branch structure, and wherein the modified cinema audio data has a modified branch structure smaller than the branch structure of the cinema audio data.

10. The system of claim 8,
wherein the plurality of cinema speakers includes a subwoofer configured to generate low frequency sound,
wherein the user information includes low frequency audio data,
wherein the cinema audio processor modifies the cinema audio data based on the low frequency audio data, and
wherein the subwoofer generates the low frequency sound corresponding to the modified cinema audio data.

11. The system of claim 10, wherein the subwoofer is disposed adjacent a seat for the user or the subwoofer is worn by the user.

12. The system of claim 2, further comprising an application processor operatively coupled to the spatialized audio processor to provide source data from which the spatialized audio processor generates the spatialized audio data.

13. The system of claim 12, wherein the application processor synchronizes the spatialized audio data with the cinema audio data.

14. The system of claim 1,
wherein the spatialized audio processor receives second timing information at a second time later than the first time to synchronize the first sound with the second sounds at the second time.

15. The system of claim 1, wherein the frame focuses the first sounds to the user's ears.

16. The system of claim 1, wherein the generated spatialized audio data includes position, orientation and volume data for each of a plurality of virtual audio sources.

17. The system of claim 1, wherein the plurality of speakers are removably attached to the frame with respective magnets.

18. A spatialized audio system, comprising:
a frame to be worn on a head of a user;
a plurality of speakers attached to the frame such that, when the frame is worn by the user, each of the plurality of speakers are disposed at a respective non-zero distance from the user's head, such that each of the plurality of speakers does not contact any surface of the user's head, including the user's ears;
a head pose sensor to collect head pose data of the user;
a head pose processor to determine a head pose of the user from the head pose data;
a spatialized audio processor to generate spatialized audio data based on the determined head pose of the user;
a microphone attached to the frame to record second sounds; and
a synchronization module operatively coupled to the spatialized audio processor,
wherein the speakers generate first sounds corresponding to the generated spatialized audio data,
wherein the synchronization module analyzes the recorded second sounds to identify a soundtrack and a time in the soundtrack,
wherein the synchronization module generates timing information based on the identity of the identified soundtrack and the identified time in the soundtrack to synchronize the first sounds with the second sounds.

* * * * *